(12) United States Patent
Xue et al.

(10) Patent No.: US 12,068,988 B2
(45) Date of Patent: Aug. 20, 2024

(54) CHANNEL STATE INFORMATION COLLECTION IN PHYSICAL SIDELINK CHANNELS

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/450,259

(22) Filed: Oct. 7, 2021

(65) Prior Publication Data

US 2023/0114450 A1   Apr. 13, 2023

(51) Int. Cl.
*H04L 5/00* (2006.01)
*H04B 7/06* (2006.01)
*H04W 72/0446* (2023.01)
*H04W 72/20* (2023.01)

(52) U.S. Cl.
CPC ......... *H04L 5/0048* (2013.01); *H04B 7/0626* (2013.01); *H04W 72/0446* (2013.01); *H04W 72/20* (2023.01)

(58) Field of Classification Search
CPC ................. H04L 5/0048; H04L 5/0053; H04L 5/0091; H04B 7/0626; H04W 72/0446; H04W 72/20
See application file for complete search history.

(56) References Cited

U.S. PATENT DOCUMENTS

| | | | |
|---|---|---|---|
| 2020/0336253 A1* | 10/2020 | He | H04W 72/23 |
| 2021/0051588 A1* | 2/2021 | Wu | H04W 52/0235 |
| 2022/0231751 A1* | 7/2022 | Grant | H04W 72/21 |
| 2023/0095061 A1* | 3/2023 | Son | H04W 24/10 370/252 |

FOREIGN PATENT DOCUMENTS

KR     20210037466 A     4/2021

OTHER PUBLICATIONS

International Search Report and Written Opinion—PCT/US2022/042643—ISA/EPO—Dec. 2, 2022.

* cited by examiner

*Primary Examiner* — Rina C Pancholi
(74) *Attorney, Agent, or Firm* — Haynes and Boone, LLP

(57) ABSTRACT

Wireless communications systems and methods related to communicating control information are provided. A method of wireless communication performed by a first user equipment (UE) may include transmitting, to a second UE in a first time period, a resource reservation indicating resources associated with at least one channel state information reference signal (CSI-RS), transmitting, to the second UE, the at least one CSI-RS in a second time period, wherein the second time period is at least K time periods after the first time period, and receiving, from the second UE, a CSI report based on the at least one CSI-RS.

30 Claims, 10 Drawing Sheets

CHANNEL STATE INFORMATION COLLECTION IN PHYSICAL SIDELINK CHANNELS

TECHNICAL FIELD

This application relates to wireless communication systems, and more particularly, to methods and devices for wireless communication using channel state information in physical sidelink channels.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), the method comprising transmitting, to a second UE in a first time period, a resource reservation indicating resources associated with at least one channel state information reference signal (CSI-RS); transmitting, to the second UE, the at least one CSI-RS in a second time period, wherein the second time period is at least k time periods after the first time period; and receiving, from the second UE, a CSI report based on the at least one CSI-RS.

In an additional aspect of the disclosure, a method of wireless communication performed by a first user equipment (UE), the method comprising receiving, from a second UE in a first time period, a resource reservation indicating resources associated with at least one channel state information reference signal (CSI-RS); receiving, from the second UE, the at least one CSI-RS in a second time period, wherein the second time period is at least k time periods after the first time period; and transmitting, to the second UE, a CSI report based on the at least one CSI-RS.

In an additional aspect of the disclosure, a first user equipment (UE) may include a memory; a transceiver; and at least one processor coupled to the memory and the transceiver, wherein the first UE is configured to transmit, to a second UE in a first time period, a resource reservation indicating resources associated with at least one channel state information reference signal (CSI-RS); transmit, to the second UE, the at least one CSI-RS in a second time period, wherein the second time period is at least k time periods after the first time period; and receive, from the second UE, a CSI report based on the at least one CSI-RS.

In an additional aspect of the disclosure, a first user equipment (UE) may include a memory; a transceiver; and at least one processor coupled to the memory and the transceiver, wherein the first UE is configured to receive, from a second UE in a first time period, a resource reservation indicating resources associated with at least one channel state information reference signal (CSI-RS); receive, from the second UE, the at least one CSI-RS in a second time period, wherein the second time period is at least k time periods after the first time period; and transmit, to the second UE, a CSI report based on the at least one CSI-RS.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be

DETAILED DESCRIPTION

Figure 1:
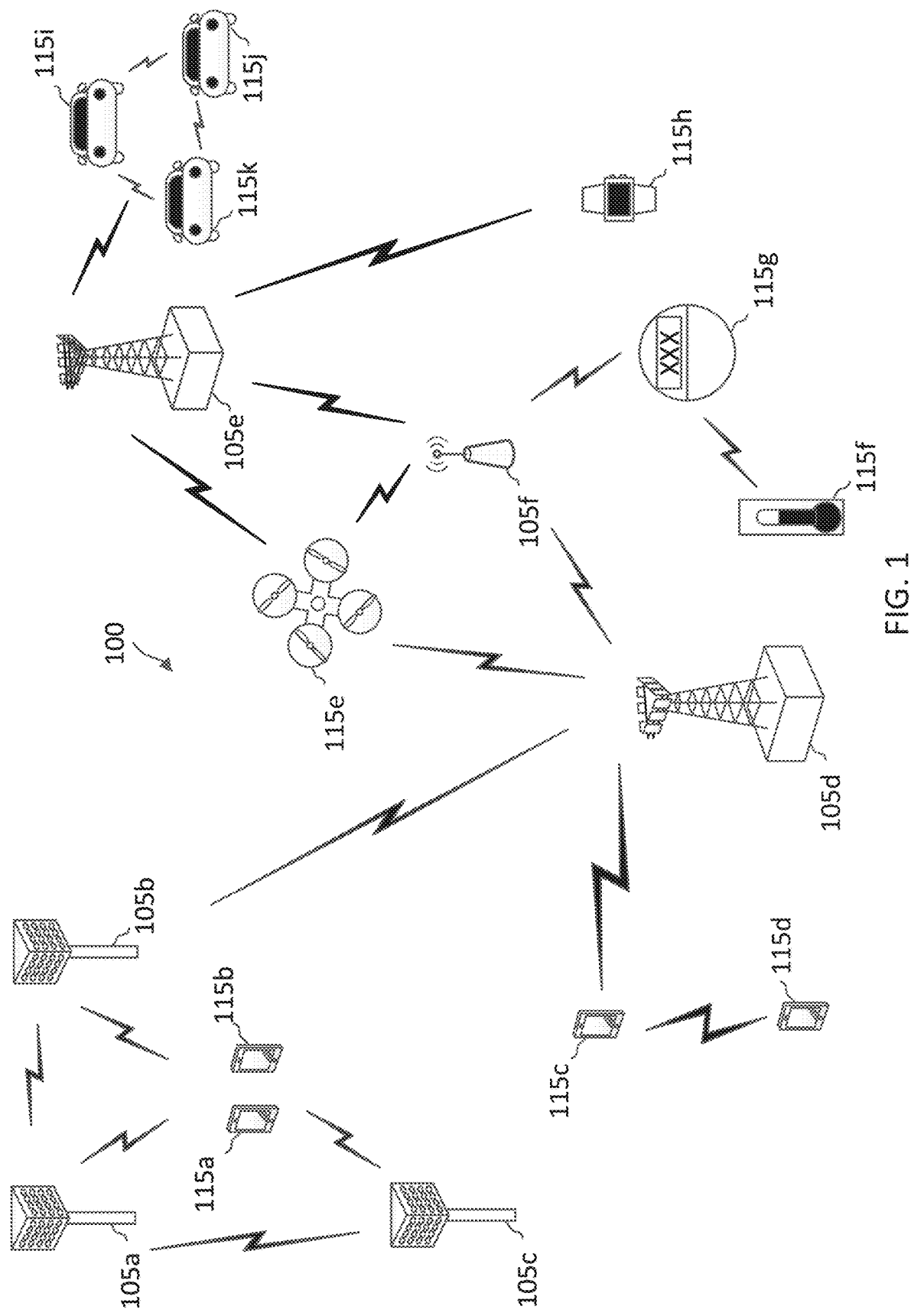
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for a first UE to communicate resource reservations to a second UE for channel state information reference signals (CSI-RS). The CSI-RSs may be transmitted from the first UE to the second UE in the reserved resources. The CSI-RSs may correspond to different beams. The second UE may perform measurements on each CSI-RS associated with a different beam and transmit a report to the first UE indicating the measurements on each of the beams. The first UE may adjust subsequent transmissions based on the CSI report in order to increase the reliability and efficiency of communications with the second UE. In this regard, wireless communication applications requiring low latency and high reliability such as vehicle-to-everything (V2X) and industrial Internet-of-things (IoT) may benefit from the methods and devices of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115g (e.g., a meter, a programmable logic controller, an IoT device, a robot, a vehicle, a smartphone, etc.) may transmit a resource reservation indicating resources associated with at least one channel state information reference signal (CSI-RS) to UE 115f in a first time period (e.g., a slot, a sub-slot). The UE 115g may transmit the at least one CSI-RS to the UE 115f in a second time period (e.g., a slot, a sub-slot). The second time period may be at least k time periods after the first time period. The value of k may be based on a beam switching time associated with a beam (e.g., a transmit beam, a receive beam) of the UE 115f. The UE 115g may transmit a request to the UE 115f for a CSI report. In response, the UE 115f may perform measurements on the CSI-RS(s) and transmit the CSI report to the UE 115g. The UE 115g may adjust subsequent transmissions based on the CSI report in order to increase the reliability and efficiency of communications with the UE 115f.

Figure 2:
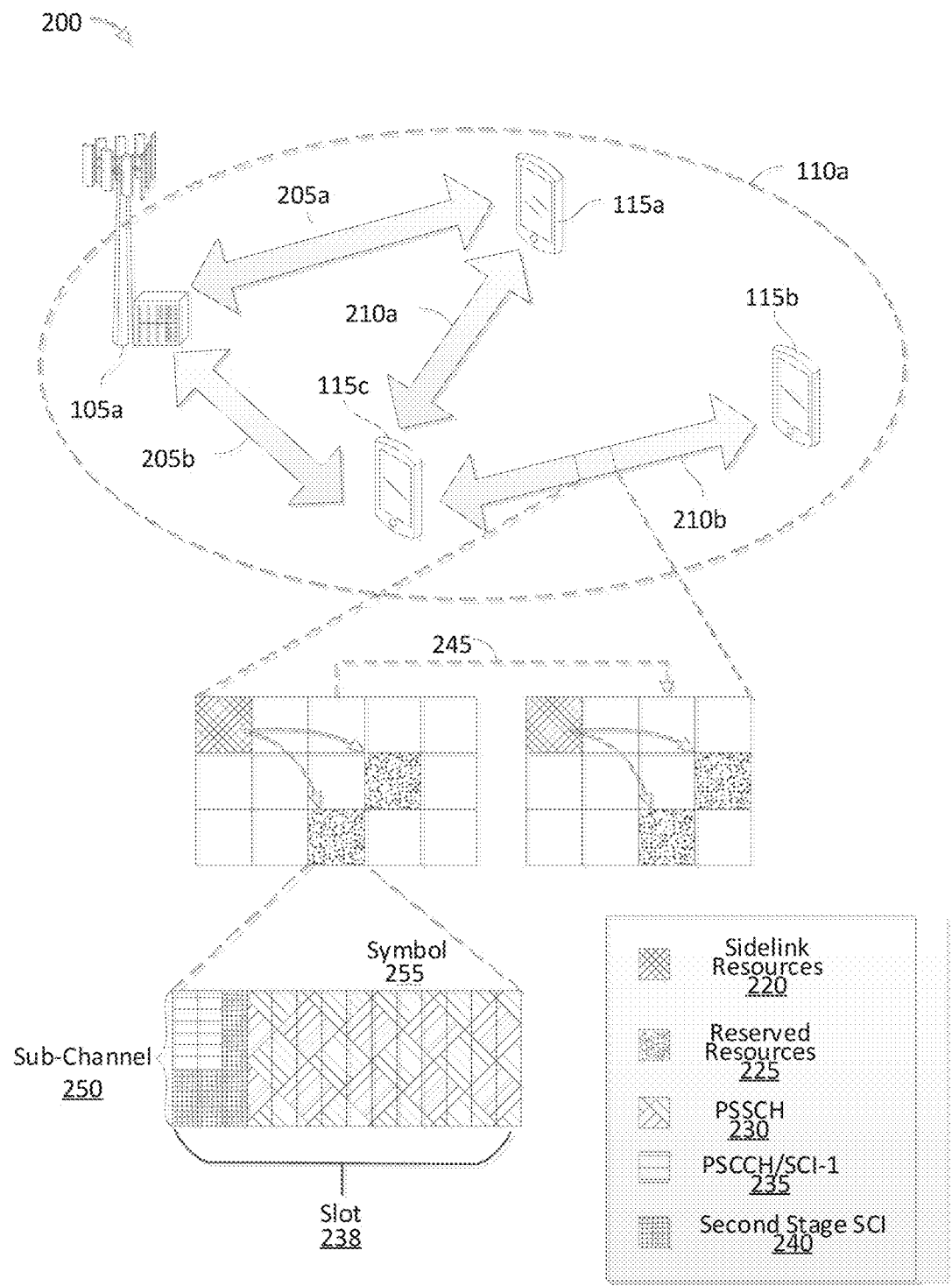
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the UE 115c may transmit a resource reservation indicating resources associated with at least one channel state information reference signal (CSI-RS) via sidelink communication link 210b to UE 115b in a first time period (e.g., a slot, a sub-slot). The UE 115c may transmit the at least one CSI-RS to the UE 115b in a second time period (e.g., a slot, a sub-slot). The second time period may be at least k time periods after the first time period. The value of k may be based on a beam switching time associated with a beam (e.g., a transmit beam, a receive beam) of the UE 115b. The UE 115c may transmit a request to the UE 115b for a CSI report via sidelink communication link 210b. In response, the UE 115b may perform measurements on the CSI-RS(s) and transmit the CSI report to the UE 115b via sidelink communication link 210b. The UE 115c may adjust subsequent transmissions based on the CSI report in order to increase the reliability and efficiency of communications with the UE 115b.

Figure 3:
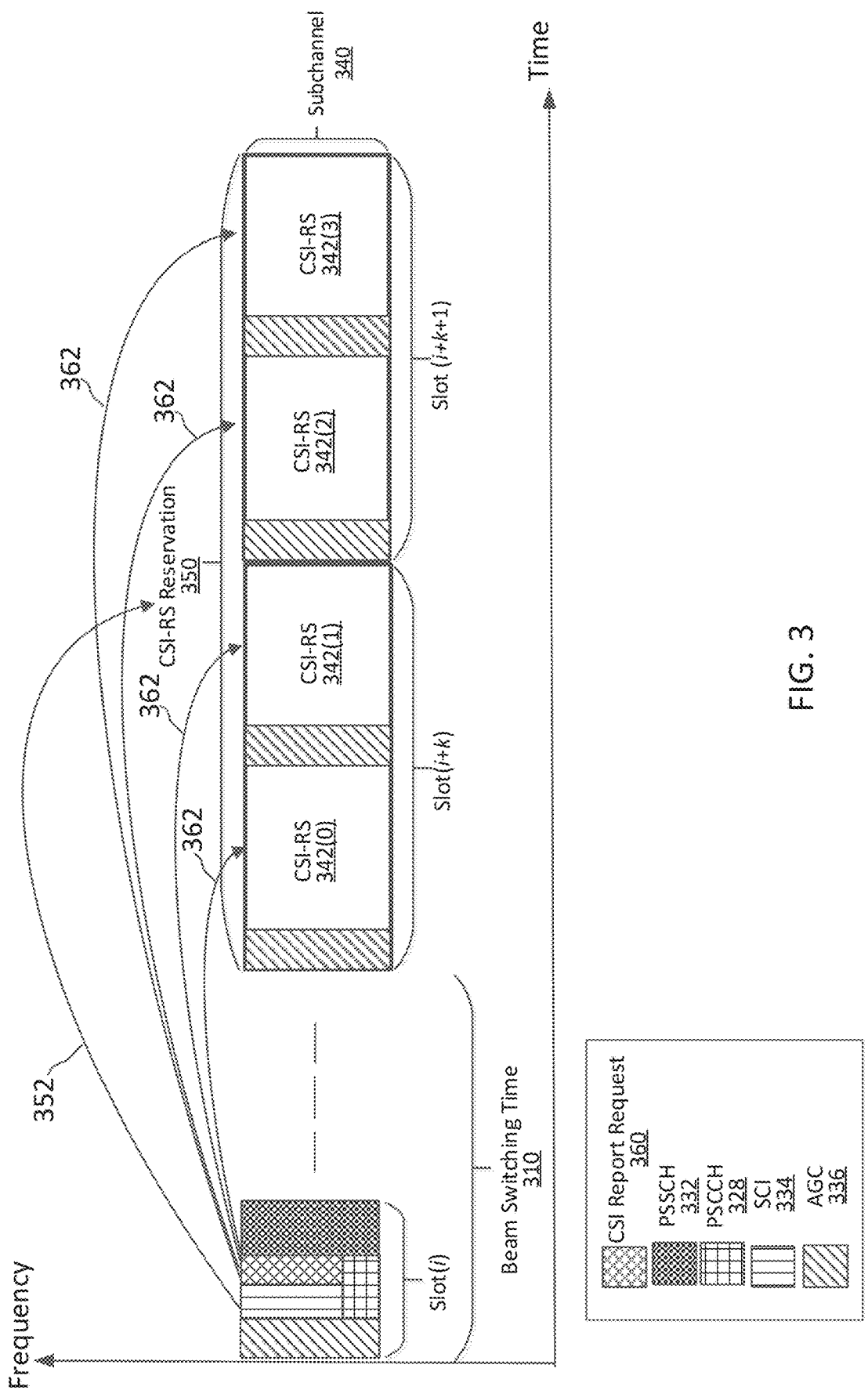
FIG. 3 illustrates resources reserved for channel state information collection according to some aspects of the present disclosure.

FIG. 3 illustrates resources reserved for channel state information collection according to some aspects of the present disclosure. In FIG. 3, the x-axis represents time in some arbitrary units and the Y-axis represents frequency in some arbitrary units. In some aspects, a first UE (e.g., the UE 115 or the UE 700) may transmit a CSI-RS reservation 350 indicating resources associated with CSI-RSs 342(0) . . . 342(3) to a second UE (e.g., the UE 115 or the UE 700) in a slot (i). In this regard, the first UE may transmit the CSI-RS reservation 350 in sidelink control information (SCI) 334 (e.g., SCI-1, SCI-2) as indicated by arrow 352. The CSI-RS reservation 350 may reserve future time and/or frequency resources for the CSI-RSs 342(0) . . . 342(3). The first UE and the second UE may communicate to each other using sidelink communications in an unlicensed frequency band (e.g., an FR2 band, an FR2x band, a frequency band in the range of about 60 GHz to about 71 GHz, or other unlicensed frequency band). The first UE may transmit the CSI-RSs 342(0) . . . 342(3) to the second UE in order to determine the state of one or more communication channels between the first and second UE. The second UE may perform measurements on the CSI-RSs 342(0) . . . 342(3) and generate a report that includes channel state information (CSI). As described below with reference to FIG. 6, the second UE may transmit the CSI report to the first UE. The first UE may adjust subsequent transmissions based on the CSI report in order to increase the reliability and efficiency of communications with the second UE.

The CSI-RS reservation 350 transmitted by the first UE may include time resources including, without limitation, slots, sub-slots, or symbols. The CSI-RS reservation 350 may include a number of time periods (e.g., slots, sub-slots, or symbols). Any number of slots, sub-slots, or symbols may be reserved. The number of reserved time periods, slots, sub-slots, or symbols may be based on the number of CSI-RSs 342(0) . . . 342(3) to be transmitted by the first UE. For example, 1, 2, 3, 4, or any number of CSI-RSs 342(0) . . . 342(3) may be transmitted in a time period. FIG. 3 shows the CSI-RS reservation 350 includes CSI-RSs 342(0) . . . 342(3) reserved in slot (i+k) and adjacent slot (i+k+1), however, the present disclosure is not so limited and any number of CSI-RSs may be reserved in any number of slots. Although FIG. 3 shows time resources for the CSI-RS reservation 350 as slot (i+k) and adjacent slot (i+k+1), the present disclosure is not so limited and the reserved time periods may include sub-slots.

The CSI-RS reservation 350 transmitted by the first UE may include frequency resources including, without limitation, a subchannel 340, a frequency range, or a frequency band. The reserved frequency resources may be the same or different from the frequency resources used by the first UE to transmit the CSI-RS reservation 350. For example, the first UE may transmit a resource reservation in a first frequency range (e.g., subchannel 340) that reserves resources in subchannel 340 or in one or more other frequency ranges (e.g., a second subchannel, a third subchannel, etc.).

In some aspects, the first UE may transmit the CSI-RSs 342(0) . . . 342(3) to the second UE in slot (i+k) and slot (i+k+1). In some instances, the slot (i+k) and slot (i+k+1) may be at least k slots after slot(i). The value of k may be based on a beam switching time 310 associated with a beam (e.g., a transmit beam, a receive beam) of the second UE. The beam may be a beamformed signal that focuses signal energy in a specific beam direction towards an intended transmitter or receiver. A beamformed signal may allow multiple transmitters to transmit at the same time in different spatial directions without interfering with each other and/or with minimal interference. The specific beam direction for the beam switching time 310 may be based on a configuration of an antenna of the second UE. In this regard, the antenna may switch between the different beam directions. The beam switching time 310 may be the time required for the second UE to switch the beam direction of the antenna from a first beam direction to a second beam direction. Each of the CSI-RSs 342(0) . . . 342(3) may be associated with a particular beam direction with one or more of the CSI-RSs 342(0) . . . 342(3) having a different beam direction than another of the CSI-RSs 342(0) . . . 342(3). Accordingly, the second UE may need to switch beam directions before receiving the CSI-RSs 342(0) . . . 342(3).

The beam switching time 310 associated with a beam of the second UE may be based on the processing capabilities of the second UE. For example, the second UE may have latencies associated with code execution and/or memory access that affect the beam switching time 310. The second UE may also have latencies associated with radio frequency components of the second UE's transceiver and/or antenna that contribute to the beam switching time 310. In some aspects, the beam switching time 310 may be based on a subcarrier spacing (SCS) associated with a physical sidelink control channel (PSCCH) 328. The first UE may transmit a communication to the second UE via the PSCCH 328. In this regard, the SCS of the PSCCH 328 may be 15 kHz, 30 kHz, 60 kHz, 120 kHz, 240 kHz, 480 kHz, or 960 kHz, or other suitable spacing. When communicating in a higher frequency band (e.g., FR2, FR2x, 60 GHz), a higher SCS (e.g., 480 kHz, 960 kHz, or other spacing) may improve robustness of the OFDM waveform against frequency impairments caused by Doppler effects, carrier frequency offsets, and/or hardware phase noise. However, the higher SCS may also increase the beam switching time 310. In order to compensate for increased beam switching time 310, the value of k (e.g., the number of time periods (slots) between the transmission of the CSI-RS reservation 350 for the CSI-RSs 342(0) . . . 342(3) in slot (i) by the first UE and the transmission of the CSI-RSs 342(0) . . . 342(3) by the first UE) may be based on the SCS of the PSCCH 328 communication.

In some aspects, the first UE may transmit a CSI report request 360 (e.g., a CSI report trigger) to the second UE. The first UE may transmit the CSI report request 360 aperiodically or periodically. In some instances, the first UE may transmit the CSI report request 360 in the same time period (e.g., slot (i)) that the first UE transmits the CSI-RS reservation 350 for the CSI-RSs 342(0) . . . 342(3). In this regard, the first UE may transmit the CSI report request 360 in sidelink control information (SCI) 334 as indicated by arrows 362. The second UE may respond to the CSI report request 360 by performing CSI measurements in the CSI-RS reservation 350 based on the CSI-RSs 342(0) . . . 342(3) and transmitting the CSI report to the first UE. The first UE may use the information in the CSI report to modify communication parameters (e.g., modulation, code rate, beam forming, frequency band, etc.) of future communications between the first UE and the second UE. The CSI report may include information related to the channel conditions between the first and second UEs for each of the beams (e.g., 1, 2, 4, 8, 16, or more beams). For example, the CSI report may include, for each beam, a channel quality indicator (CQI), a reference signal received power (RSRP), a reference signal received quality (RSRQ), a signal to interference and noise ratio (SINR), and/or a rank indicator (RI).

In some aspects, the first UE may transmit a CSI report request 360 for a plurality of CSI reports. In response to the CSI report request 360, the second UE may transmit the plurality of CSI reports based on the CSI-RSs 342(0) . . . 342(3). The first UE may transmit a single CSI report request 360 (e.g., a CSI report trigger) for a plurality of CSI reports. The CSI report request 360 may include a request for channel measurement and interference measurement (e.g., simultaneous channel measurement and interference measurement) based on the CSI-RS reservation 350 (e.g., periodic reserved resources) for the CSI-RSs 342(0) . . . 342(3). The CSI report request 360 for the plurality of CSI reports may be configured in a layer 3 message (e.g., a PC5-RRC message). For example, the layer 3 message may be a CSI-AperiodicTriggerStateList message or other suitable message. In some aspects, the first UE may transmit the CSI report request 360 to the second UE to request the CSI report(s) via an indicator (e.g., an index) in the SCI 334.

In some aspects, the first UE may transmit, to the second UE, an automatic gain control (AGC) symbol 336 before each of the CSI-RSs 342(0) . . . 342(3). The AGC symbol 336 may be transmitted by the first UE to the second UE to allow the second UE to adjust the strength (e.g., the gain) of a received signal in order to reduce the quantization error of the signal at a receiver of second UE. By transmitting the AGC symbol 336 in a symbol location before (e.g., immediately before) each of the CSI-RSs 342(0) . . . 342(3), the second UE may adjust a gain setting of its receiver to measure the CSI-RSs 342(0) . . . 342(3).

In some aspects, the first UE may transmit the CSI-RS reservation 350 in one or more sub-slots of the slot (i). In some aspects, the first UE may transmit the CSI-RSs 342(0) . . . 342(3) in one or more sub-slots of slot (i+k) and slot (i+k+1). A time period such as slot (i), slot (i+k) and slot (i+k+1) may be partitioned into sub-slots. A sub-slot may include a number of symbols (e.g., contiguous symbols) within the time period (e.g., the slot). For example, a sub-slot may include 1, 2, 3, 4, 5, or more symbols within the time period (e.g., the slot). In order to increase the efficient use of resources in slot (i+k) and slot (i+k+1), slot (i+k) and slot (i+k+1) may be partitioned into sub-slots where a subset or all of the sub-slots are used to carry the CSI-RSs 342(0) . . . 342(3). For example, slot (i+k) and slot (i+k+1) may each include 14 symbols, each sub-slot in slot (i+k) and slot (i+k+1) may include one symbol for an AGC symbol 336 and one, two, or more symbols for the CSI-RSs 342(0) . . . 342(3).

Figure 4:
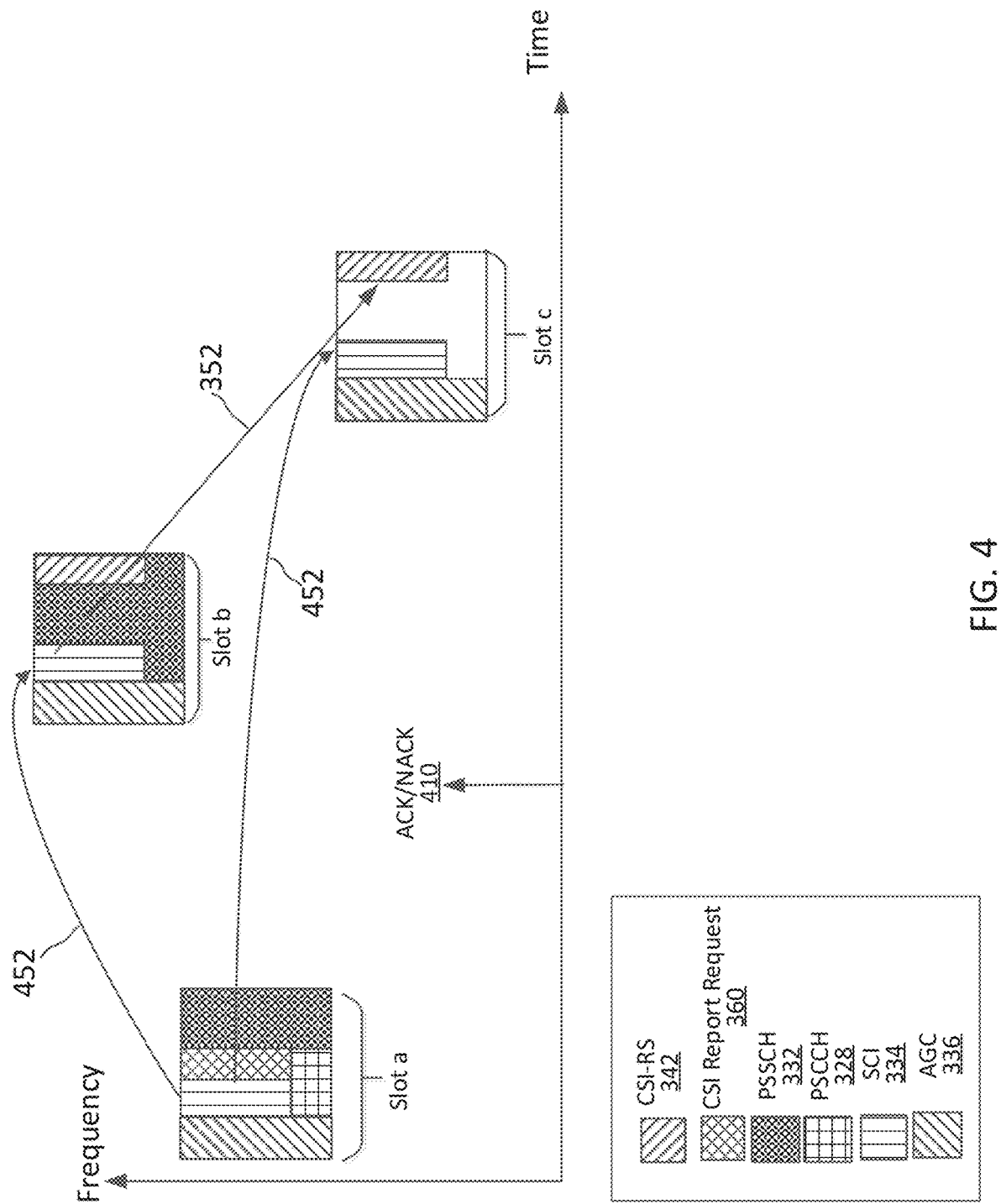
FIG. 4 illustrates resources reserved for channel state information collection and transport block communication according to some aspects of the present disclosure.

FIG. 4 illustrates resources reserved for channel state information collection and transport block communication according to some aspects of the present disclosure. In some aspects, the first UE may transmit a transport block (TB) to the second UE. The first UE may transmit the TB via a PSSCH 332. The first UE may transmit a resource reservation in slot a to reserve resources in slot b and slot c for the possible retransmission of the TB. The first UE may transmit the TB in the PSSCH 332 and the resource reservation for the retransmission of the TB (as indicated by arrows 452) in slot a. In some aspects, the resource reservation that reserves the resources for the CSI-RS(s) 342 may also reserve the resources for the potential retransmission of the TB. The first UE may reserve resources for retransmission of the TB in slot b and/or slot c in the event that the initial transmission of the TB in slot a fails to be properly decoded by the receiving UE. For example, if a negative acknowledgement (NACK) associated with the TB is received by the first UE in the ACK/NACK 410, the first UE may retransmit the TB to the second UE in the reserved resources in slot b and/or slot c. In some aspects, when the TB transmitted in slot a is properly decoded by the receiving UE, a positive acknowledgement (ACK) may be received by the first UE in the ACK/NACK 410. In this case, the resources reserved for the retransmission of the TB in slot b and slot c may be overridden (e.g., re-purposed) for other uses (e.g., transmission of CSI-RS(s) 342). For example, the first UE may transmit a resource reservation via SCI 334 in slot b for CSI-RS 342 in slot c (as indicated by arrow 352) that overrides the resource reservation for retransmission of the TB in response to receiving the ACK.

In some aspects, the first UE may transmit the resource reservation, the TB via the PSSCH 332, and the CSI report request 360 in slot a. In some aspects, the first UE may transmit the CSI-RS(s) 342 in slot b and/or slot c while refraining from transmitting a PSSCH 332 in slot b and/or slot c. In other words, the CSI-RS(s) 342 may be transmitted as a standalone CSI-RS(s) 342 in slot b and/or slot c without the first UE transmitting a PSSCH 332 in slot b and/or slot c. In the example shown in FIG. 4, slot b includes a CSI-RS 342 and a PSSCH 332 while slot c includes a CSI-RS 342 and excludes a PSSCH 332. In other words, slot c includes a standalone CSI-RS 342.

Figure 5:
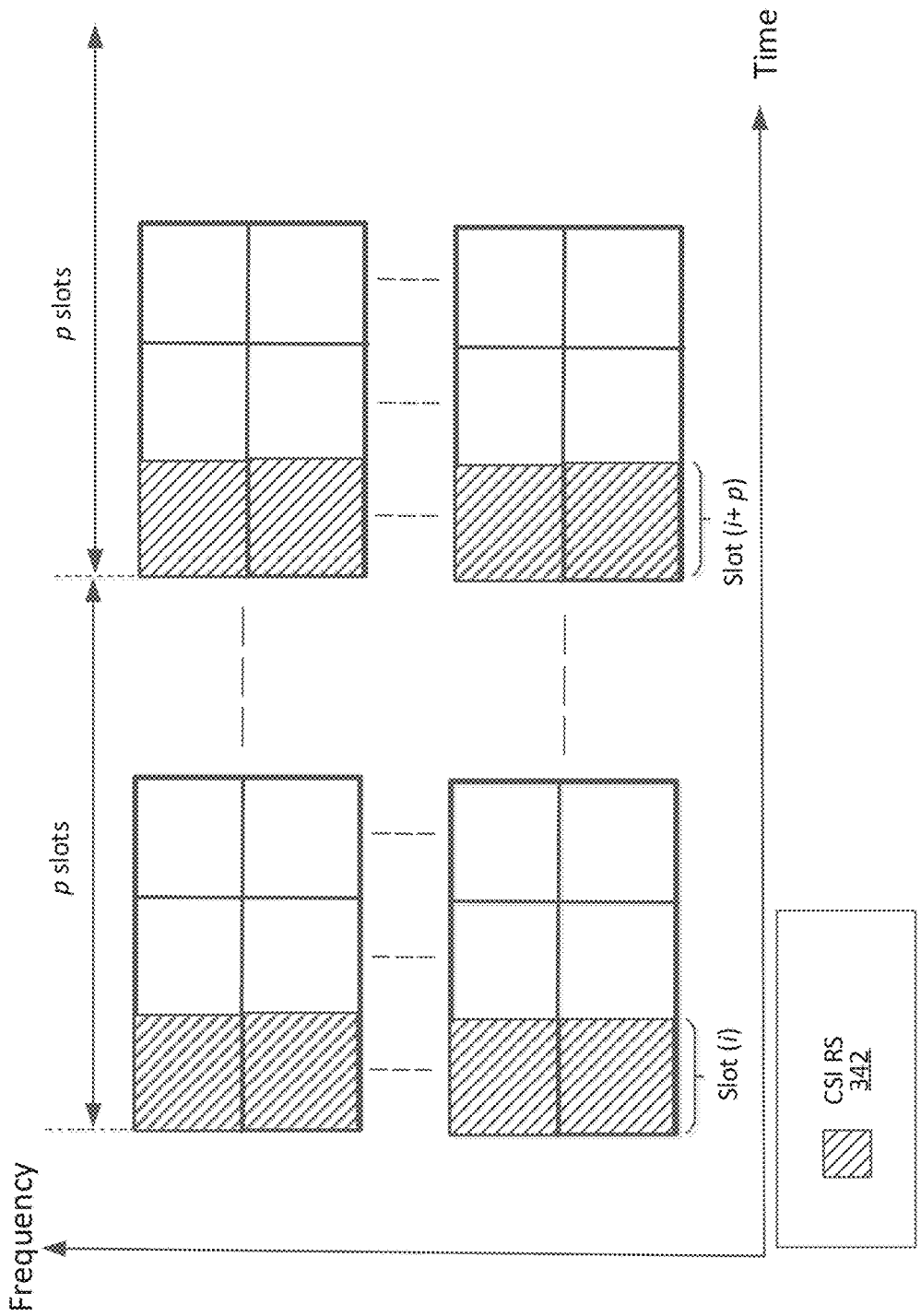
FIG. 5 illustrates resources reserved for periodic channel state information collection associated with a beam according to some aspects of the present disclosure.

FIG. 5 illustrates resources reserved for periodic channel state information collection associated with a beam according to some aspects of the present disclosure. In some aspects, the CSI-RS resource reservation may indicate periodic resources in slot (i) and slot (i+p) associated with the CSI-RS(s) 342. The first UE may transmit a resource reservation that includes periodic resources slot (i) and slot (i+p) for transmitting the CSI-RS(s) 342. By transmitting a resource reservation that includes periodic resources in slot (i) and slot (i+p), the overhead and/or latency associated with transmitting the resource reservation may be reduced compared to transmitting a resource reservation for each of the CSI-RS(s) 342. For example, the resource reservation may include resources in slot (i) and slot (i+p) reserved for transmitting the CSI-RS(s) 342 in every p-slots and/or in every p sub-slots. The set of resources reserved in every p-slots and/or in every p sub-slots may be used for beam sweeping. For example, the first UE may transmit a CSI-RS 342 for each transmit beam (e.g., each directional antenna) of the first UE and/or for each receive beam (e.g., each directional antenna) of the second UE. In some aspects, the first UE may transmit a codepoint in SCI (e.g., SCI-1, SCI-2) that indicates the period p associated with the periodic resources for transmitting the CSI-RS(s) 342 in every p slots and/or in every p sub-slots. A codepoint may be a bit or set of bits in the SCI that indicate the period p. In some aspects, the first UE may transmit the codepoint in a traditional (e.g., legacy) position of an SCI-2 carried by a PSSCH. However, the codepoint in a traditional position may be restricted as to the value of p (e.g., the value of p may be limited to 31 slots).

In some aspects, the first UE may transmit the codepoint in a non-traditional position of an SCI-2 or in another information element. The codepoint in the non-traditional position may allow a larger range of values for p (e.g., the value of p may be over 31 slots).

In some aspects, the first UE may transmit the resource reservation for the CSI-RS(s) 342 in a configured grant (CG) carried by a layer 3 message. In this regard, the first UE may transmit the CG in a radio resource control (RRC) message. The CG may include a resource reservation for periodic transmission of a PSSCH and/or the CSI-RS(s) 342. In some aspects, the first UE may request the CG from a base station (BS) (e.g., the BS 105 or BS 800). In response, the BS may transmit the CG to the first UE. Within each transmission period of the CG, the first UE may transmit an indicator indicating whether the CSI-RS(s) 342 will be transmitted with the PSSCH. In this regard, the indicator may be transmitted in an SCI (e.g., SCI-1, SCI-2). The second UE may decode the indicator in the SCI to determine whether the first UE will transmit the CSI-RS(s) 342 in the associated transmission period. If the SCI indicates the first UE will transmit the CSI-RS(s) 342 then the second UE may perform measurements on the CSI-RS(s) 342. In some aspects, the SCI may indicate the first UE will not transmit the CSI-RS(s) 342 for that particular transmission period. Instead, the first UE may use the reserved resources indicated by the CG to transmit a TB(s) via a PSSCH or to receive a TB(s) via the PSSCH. In this way, the first UE may prioritize the reserved resources for transmission of TB(s) over the CSI-RS measurements. In some aspects, the CG may include a resource reservation for periodic transmission of the CSI report(s). The second UE may periodically transmit the CSI reports to the first UE in the reserved resources based on the CSI-RS(s) 342. The second UE may periodically transmit the CSI reports to the first UE in MAC-CE messages. Additionally or alternatively, the second UE may use dynamic channel access to obtain resources to transmit the CSI report(s). For example, the second UE may transmit a resource request to the first UE and/or the BS for resources to transmit the CSI report to the first UE. In response, the first UE and/or the BS may transmit an indicator indicating resources to transmit the CSI report. In some instances, the first UE may transmit an indicator to the second UE indicating whether the second UE should transmit the CSI-report. In this regard, the indicator indicating whether the second UE should transmit the CSI-report may be transmitted in a codepoint in the SCI or via another suitable indicator. In this way, the first UE may receive requested CSI report(s) aperiodically based on the periodic CSI-RS(s).

In some aspects, the first UE may transmit, to a base station (BS), a request for resources reserved for the CSI-RS(s) 342. The first UE may receive an indicator from the BS indicating the resources reserved for the CSI-RS(s) 342 in response to the request. For example, the first UE may operate in sidelink mode 1 in which the UE is in communication with the BS. The first UE may request from the BS resources for the transmission of the CSI-RS(s) 342 from the first UE to the second UE and resources for the transmission of the CSI report from the second UE to the first UE. In this regard, the first UE may request the resources from the BS in a MAC-CE message or a buffer status report (BSR). The resource request may include an indicator indicating the value of k in order to satisfy the beam switching time of the second UE. The value of k may be the number of time periods (slots and/or sub-slots) between the transmission of the resource reservation for the CSI-RS(s) 342 and the transmission of the CSI-RS(s) 342 as described above with reference to FIG. 3. In response, the BS may transmit an indicator indicating the reserved resources. In this regard, the indicator may be transmitted in a downlink control information message (e.g., DCI-3 message). In some aspects, the indicator may further indicate whether the first UE may override the resources reserved for the retransmission of a TB by resources reserved for the transmission of the CSI-RS(s) 342 as described above with reference to FIG. 4. In some aspects, the indicator may further indicate whether the reserved resources are periodic resources dedicated for beam sweeping as described above with reference to FIG. 5. In some aspects, the indicator may further indicate whether the reserved resources include resources for transmission of an AGC symbol before each CSI-RS as described above with reference to FIG. 3.

Figure 6:
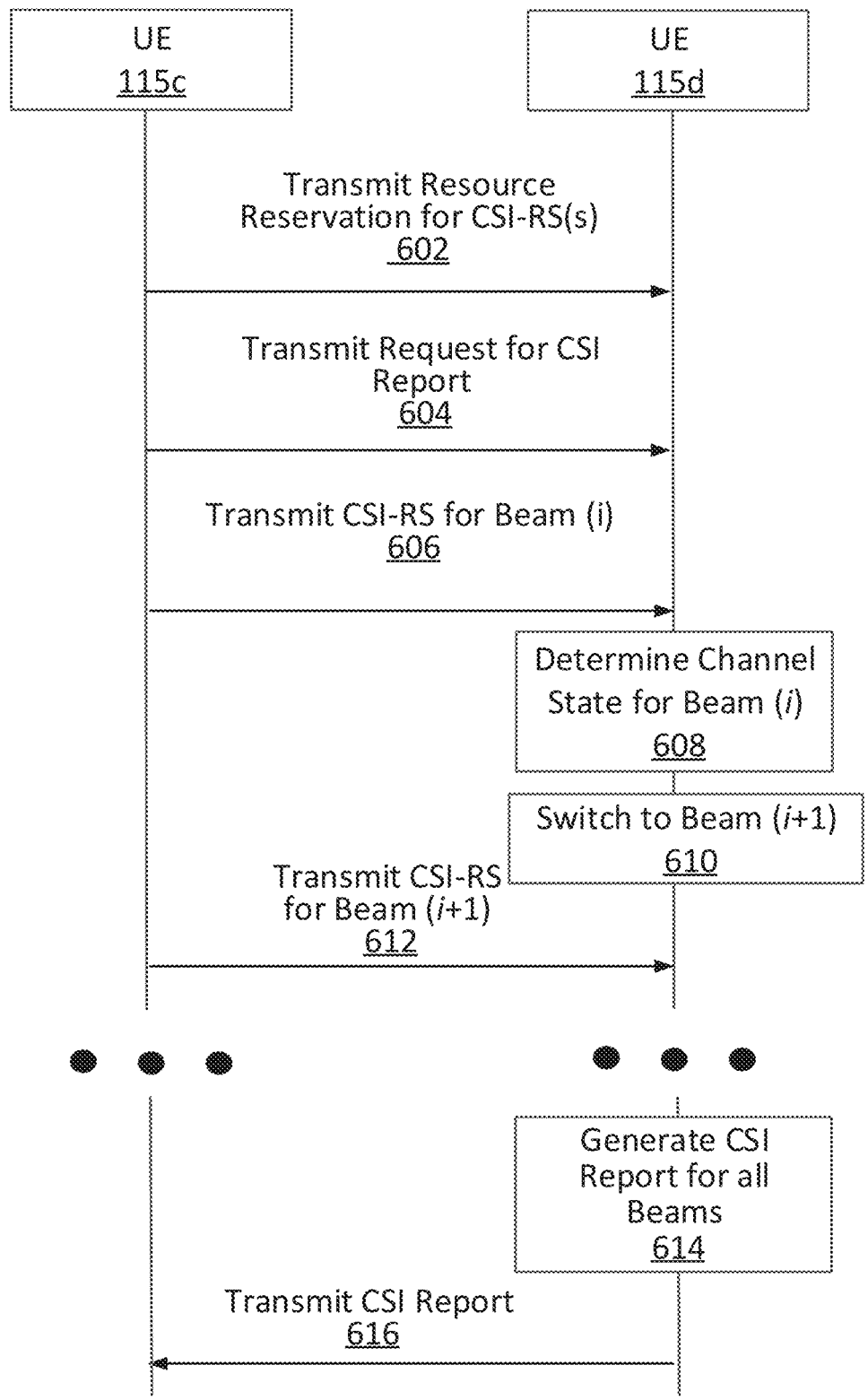
FIG. 6 is a signaling diagram of a communication method according to some aspects of the present disclosure.

FIG. 6 is a signaling diagram of a communication method according to some aspects of the present disclosure. Steps of the signaling diagram 600 can be executed by a computing device (e.g., a processor, processing circuit, and/or other suitable component) of a communication device or other suitable means for performing the steps. For example, a communication device, such as the UE 115 or the UE 700, may utilize one or more components, such as a processor 702, a memory 704, instructions 706, a CSI collection module 708, a transceiver 710, a modem 712, an RF unit 714, and one or more antennas 716 to execute the steps of method signaling diagram 600.

At action 602, a UE 115c may transmit a resource reservation for CSI-RS(s) to UE 115d. In this regard, the UE 115c may transmit the resource reservation in sidelink control information (SCI) (e.g., SCI-1, SCI-2). The resource reservation may reserve future time and/or frequency resources for the CSI-RS(s). The UE 115c and the UE 115d may communicate to each other using sidelink communications in an unlicensed frequency band (e.g., an FR2 band, an FR2x band, a frequency band in the range of about 60 GHz to about 71 GHz, or other unlicensed frequency band). The UE 115c may transmit the CSI-RS(s) to the UE 115d in order to determine the state of one or more communication channels between the UE 115c and the UE 115d.

At action 604, the UE 115c may transmit a request for a CSI report to UE 115d. In this regard, the UE 115c may transmit the CSI report request aperiodically or periodically. In some instances, the UE 115c may transmit the CSI report request in the same time period that the UE 115c transmits the resource reservation for the CSI-RS(s) at action 602. In this regard, the UE 115c may transmit the request for the CSI report in sidelink control information (SCI) (e.g., SCI-1, SCI-2). In some aspects, the UE 115c may transmit a request for a plurality of CSI reports to the UE 115d. In some aspects, the UE 115c may transmit a request to the UE 115d to periodically transmit the CSI report(s) to the UE 115c. In this regard, the UE 115c may transmit the request to the UE 115d to periodically transmit the CSI report(s) to the UE 115c using layer 3 signaling (e.g., PC5-RRC signaling). In some aspects, the CSI report request transmitted by the UE 115c may include an indicator (e.g., an index) indicating the configuration for communicating the CSI report in the MAC-CE.

At action 606, the UE 115c may transmit a CSI-RS for beam (i) (e.g., a first beam). The set of resources reserved at action 602 may be used for beam sweeping. For example, the UE 115c may transmit a CSI-RS for each transmit beam (e.g., each directional antenna) of the UE 115c and/or for each receive beam (e.g., each directional antenna) of the UE 115d. In some aspects, the UE 115c may transmit a codepoint in SCI (e.g., SCI-1, SCI-2) that indicates the period p associated with the periodic resources for transmitting the CSI-RS(s) in every p-slots and/or in every p sub-slots.

At action 608, the UE 115d may determine the channel state between the UE 115c and 115d for beam (i). For example, the UE 115c may determine for beam (i), a channel quality indicator (CQI), a reference signal received power (RSRP), a reference signal received quality (RSRQ), a signal to interference and noise ratio (SINR), and/or a rank indicator (RI).

At action 610, the UE 115d may switch to beam (i+1). Each specific beam direction may be based on a configuration of an antenna of the UE 115c or UE 115d. In this regard, the antenna may switch between the different beam directions. A beam switching time may be the time required for the UE 115c or UE 115d to switch the beam direction of the antenna from a first beam direction (e.g., beam (i)) to a second beam direction (e.g., beam (i+1). Each of the CSI-RS(s) may be associated with a particular beam direction with one or more of the CSI-RS(s) having a different beam direction than another of the CSI-RS(s). Accordingly, the UE 115d may switch beam directions before receiving the CSI-RS(s).

At action 612, the UE 115c may transmit a CSI-RS for beam (i+1) (e.g., the next beam in a set of beams). The set of resources reserved at action 602 may be used for beam sweeping. For example, the UE 115c may transmit a CSI-RS for each transmit beam (e.g., each directional antenna) of the UE 115c and/or for each receive beam (e.g., each directional antenna) of the UE 115d. The actions 608, 610, and 612 may be repeated for each beam of the set of beams as indicated by the ellipsis in FIG. 6.

At action 614, the UE 115d may generate a CSI report for all the beams associated with actions 608, 610, and 612. The CSI report may include information related to the channel conditions between the UEs 115c and 115d for each of the beams (e.g., 1, 2, 4, 8, 16, or more beams). For example, the CSI report may include, for each beam, a channel quality indicator (CQI), a reference signal received power (RSRP), a reference signal received quality (RSRQ), a signal to interference and noise ratio (SINR), and/or a rank indicator (RI).

At action 616, the UE 115d may transmit the CSI report to the UE 115c. The UE 115d may perform the CSI measurements on the received CSI-RS(s), generate the CSI report, and transmit the CSI report to the first UE within a time span defined by a timer. In some aspects, the UE 115d may periodically transmit the CSI report(s) to the UE 115c. In this regard, the UE 115c may transmit the request to the UE 115d to periodically transmit the CSI report(s) to the UE 115c using layer 3 signaling (e.g., PC5-RRC signaling).

Figure 7:
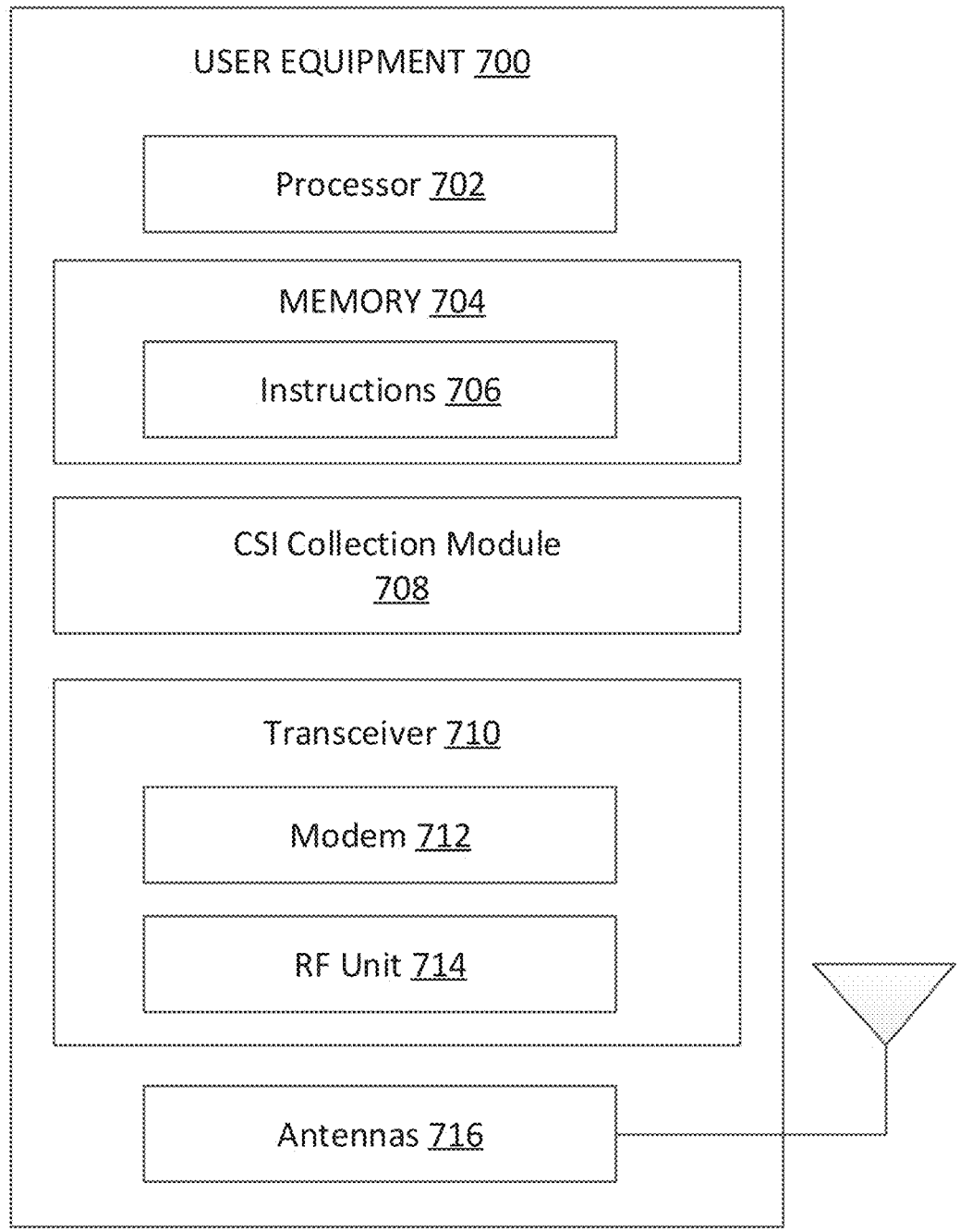
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 or 200 as discussed above. As shown, the UE 700 may include a processor 702, a memory 704, a CSI collection module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-6 and 9-10. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The CSI collection module 708 may be implemented via hardware, software, or combinations thereof. For example, the CSI collection module 708 may be implemented as a processor, circuit, and/or instructions 706 stored in the memory 704 and executed by the processor 702.

The CSI collection module 708 may be used for various aspects of the present disclosure, for example, aspects of FIGS. 2-6 and 9-10. The CSI collection module 708 is configured to transmit, to another UE in a first time period, a resource reservation indicating resources associated with at least one CSI-RS. The CSI collection module 708 is further configured to transmit, to the other UE, the at least one CSI-RS in a second time period, wherein the second time period is at least K time periods after the first time period. The CSI collection module 708 is further configured to receive a CSI report based on the at least one CSI-RS from the other UE.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the CSI collection module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the CSI collection module 708, and/or the transceiver 710. The processor 702 and may execute operating system (OS) code stored in the memory 704 in order to control and/or coordinate operations of the CSI collection module 708 and/or the transceiver 710. In some aspects, the processor 702 may be implemented as part of the CSI collection module 708.

Figure 8:
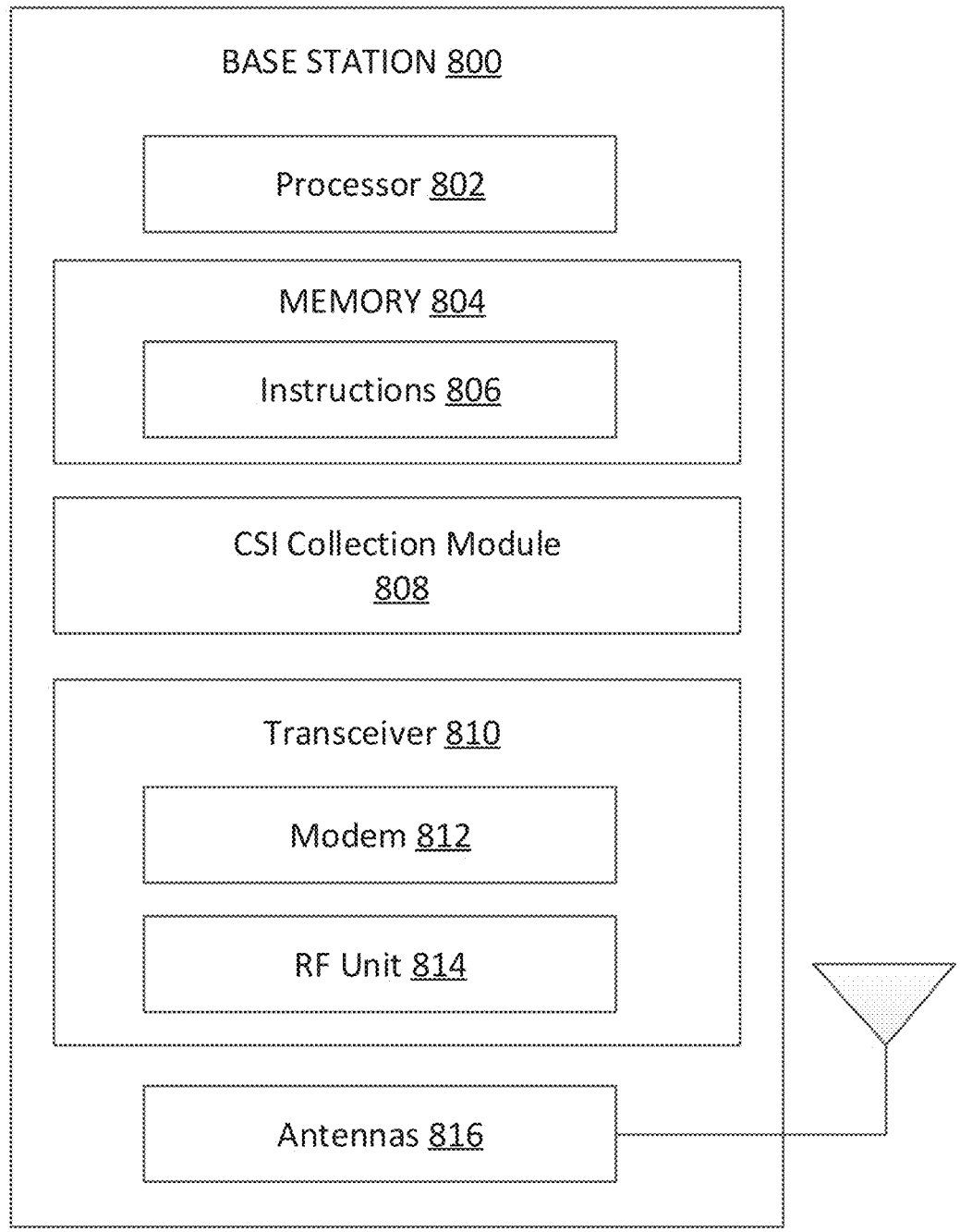
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a CSI collection module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-10. Instructions 806 may also be referred to as code, which may be interpreted broadly to include any type of computer-readable statement(s).

The CSI collection module 808 may be implemented via hardware, software, or combinations thereof. For example, the CSI collection module 808 may be implemented as a processor, circuit, and/or instructions 806 stored in the memory 804 and executed by the processor 802.

The CSI collection module 808 may be used for various aspects of the present disclosure, for example, aspects of FIGS. 2-6 and 9-10. The CSI collection module 808 is configured to transmit a resource reservation to a UE in a configured grant (CG) carried by a layer 3 message. The CSI collection module 808 is configured to transmit the CG in a radio resource control (RRC) message. The CG may include a resource reservation for periodic transmission of a PSSCH and/or the CSI-RS(s). In some aspects, the CSI collection module 808 is configured to receive a request for the CG from the UE.

Additionally or alternatively, the CSI collection module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the CSI collection module 808, and/or the transceiver 810. The processor 802 may execute OS code stored in the memory 804 to control and/or coordinate operations of the CSI collection module 808, and/or the transceiver 810. In some aspects, the processor 802 may be implemented as part of the CSI collection module 808. In some aspects, the processor 802 is configured to transmit via the transceiver 810, to a UE, an indicator indicating a configuration of sub-slots within a slot.

Figure 9:
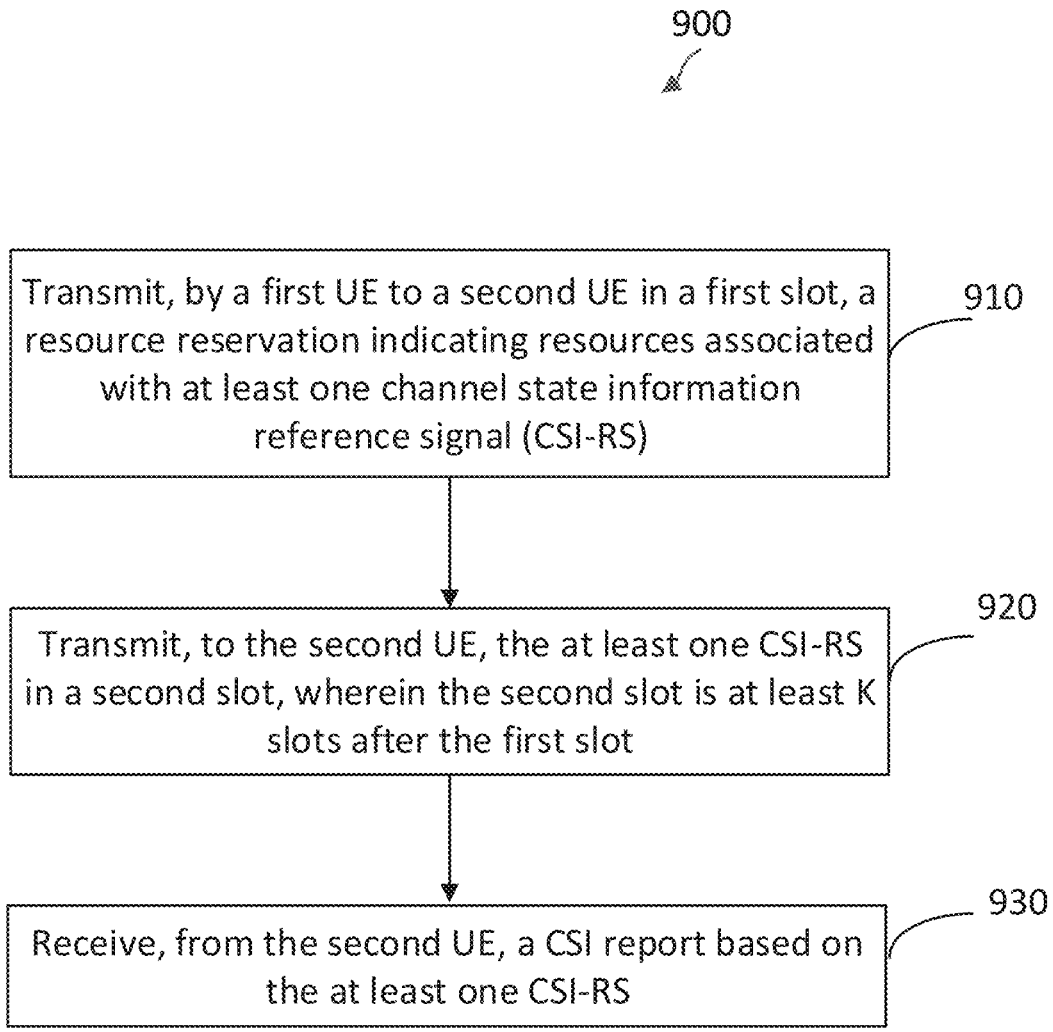
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 802, the memory 804, the CSI collection module 808, the transceiver 810, the modem 812, and the one or more antennas 816, to execute aspects of method 900. The method 900 may employ similar mechanisms as in the networks 100 and 200 and the aspects and actions described with respect to FIGS. 2-7. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a first UE (e.g., the UE 115 or the UE 700) transmitting, to a second UE in a first time period, a resource reservation indicating resources associated with at least one channel state information reference signal (CSI-RS). In this regard, the first UE may transmit the resource reservation in sidelink control information (SCI) (e.g., SCI-1, SCI-2). The resource reservation may reserve future time and/or frequency resources for the CSI-RS(s). The first UE and the second UE may communicate to each other using sidelink communications in an unlicensed frequency band (e.g., an FR2 band, an FR2x band, a frequency band in the range of about 60 GHz to about 71 GHz, or other unlicensed frequency band). The first UE may transmit the CSI-RS(s) to the second UE in order to determine the state of one or more communication channels between the first and second UE. The second UE may perform measurements on the CSI-RS(s) and generate a report that includes channel state information (CSI). As described below, the second UE may transmit the CSI report to the first UE. The first UE may adjust subsequent transmissions based on the CSI report in order to increase the reliability and efficiency of communications with the second UE.

The resource reservation transmitted by the first UE at action 910 may include time resources including, without limitation, slots, sub-slots, or symbols. The resource reservation may include a number of time periods (e.g., slots, sub-slots, or symbols). Any number of slots, sub-slots, or symbols may be reserved. The number of reserved slots, sub-slots, or symbols may be based on the number of CSI-RSs to be transmitted by the first UE. For example, 1, 2, 3, 4, or any number of CSI-RSs may be transmitted in a time period.

The resource reservation transmitted by the first UE at action 910 may include frequency resources including, without limitation, a subchannel, a frequency range, or a frequency band. The reserved frequency resources may be the same or different from the frequency resources used by the first UE to transmit the resource reservation. For example, the first UE may transmit a resource reservation in a first frequency range (e.g., a first subchannel) that reserves resources in the first frequency range or in one or more other frequency ranges (e.g., a second subchannel, a third subchannel, etc.).

At action 920, the method 900 includes the first UE (e.g., the UE 115 or the UE 700) transmitting, to the second UE, the CSI-RS(s) in a second time period. The second time period may be different than the first time period. In some instances, the second time period may be at least k time periods after the first time period. In this regard, the resource reservation at 910 may reserve time resources (e.g., slot, sub-slots, symbols) in a second time period at least k time periods or more after the first time period for first UE to transmit the CSI-RS(s). The value of k may be based on a beam switching time associated with a beam (e.g., a transmit beam, a receive beam) of the second UE. The beam may be a beamformed signal that focuses signal energy in a specific beam direction towards an intended transmitter or receiver. A beamformed signal may allow multiple transmitters to transmit at the same time in different spatial directions without interfering with each other and/or with minimal interference. The specific beam direction for the beam switching time may be based on a configuration of an antenna of the UE. In this regard, the antenna may switch between the different beam directions. A beam switching time may be the time required for the UE to switch the beam direction of the antenna from a first beam direction to a second beam direction. Each of the CSI-RS(s) may be associated with a particular beam direction with one or more of the CSI-RS(s) having a different beam direction than another of the CSI-RS(s). Accordingly, the second UE may need to switch beam directions before receiving the CSI-RS(s).

The beam switching time associated with a beam of the second UE may be based on the processing capabilities of the second UE. For example, the second UE may have latencies associated with code execution and/or memory access that affect the beam switching time. The second UE may also have latencies associated with radio frequency components of the second UE's transceiver and/or antenna that contribute to the beam switching time. In some aspects, the beam switching time may be based on a subcarrier spacing (SCS) associated with a physical sidelink control channel (PSCCH). The first UE may transmit a communication to the second UE via the PSCCH. In this regard, the SCS of the PSCCH may be 15 kHz, 30 kHz, 60 kHz, 120 kHz, 240 kHz, 480 kHz, or 960 kHz, or other suitable spacing. When communicating in a higher frequency band (e.g., FR2, FR2x, 60 GHz), a higher SCS (e.g., 480 kHz, 960 kHz, or other spacing) may improve robustness of the OFDM waveform against frequency impairments caused by Doppler effects, carrier frequency offsets, and/or hardware phase noise. However, the higher SCS may also increase the beam switching time. In order to compensate for increased beam switching time, the value of k (e.g., the number of time periods between the transmission of the resource reservation for the CSI-RS(s) by the first UE and the transmission of the CSI-RS(s) by the first UE) may be based on the SCS of the PSCCH communication.

In some aspects, the first UE may transmit a request for a CSI report (e.g., a CSI report trigger) to the second UE. The first UE may transmit the CSI report request aperiodically or periodically. In some instances, the first UE may transmit the CSI report request in the same time period that the first UE transmits the resource reservation for the CSI-RS(s). In this regard, the first UE may transmit the request for the CSI report in sidelink control information (SCI) (e.g., SCI-1, SCI-2). The second UE may respond to the CSI report request by performing CSI measurements in the reserved resources for the CSI-RS(s) and transmitting the CSI report to the first UE. The first UE may use the information in the CSI report to modify communication parameters (e.g., modulation, code rate, beam forming, frequency band, etc.) of future communications between the first UE and the second UE. The CSI report may include information related to the channel conditions between the first and second UEs for each of the beams (e.g., 1, 2, 4, 8, 16, or more beams). For example, the CSI report may include, for each beam, a channel quality indicator (CQI), a reference signal received power (RSRP), a reference signal received quality (RSRQ), a signal to interference and noise ratio (SINR), and/or a rank indicator (RI).

In some aspects, the first UE may transmit a request for a plurality of CSI reports. In response to the request, the second UE may transmit the plurality of CSI reports based on the CSI-RS(s). The first UE may transmit a single request (e.g., a CSI report trigger) for a plurality of CSI reports. The CSI report request may include a request for channel measurement and interference measurement (e.g., simultaneous channel measurement and interference measurement) based on the reserved resources (e.g., periodic reserved resources) for the CSI-RS(s). The request for the plurality of CSI reports may be configured in a layer 3 message (e.g., a PC5-RRC message). For example, the layer 3 message may be a CSI-AperiodicTriggerStateList message or other suitable message. In some aspects, the first UE may transmit the CSI report trigger to the second UE to request the CSI report(s). For example, the first UE may transmit an indicator (e.g., an index) in the SCI to request the CSI report(s) from the second UE.

At action 930, the method 900 includes the first UE (e.g., the UE 115 or the UE 700) receiving, from the second UE, the CSI report based on the CSI-RS(s) transmitted by the first UE to the second UE. In this regard, the first UE may receive the CSI report in a medium access control (MAC) control element (CE). The MAC-CE may be received by the first UE from the second UE via a physical sidelink shared channel (PSSCH). After transmitting the CSI-RS(s), the first UE may start a timer (e.g., sl-LatencyBound-CSI-Report timer or other suitable timer). The first UE may stay in receive mode for at least the time span defined by the timer to receive the CSI report. The second UE may perform the CSI measurements on the received CSI-RS(s), generate the CSI report, and transmit the CSI report to the first UE within the time span defined by the timer. In some aspects, the first UE may transmit a request to the second UE to periodically transmit the CSI report(s) to the first UE. In this regard, the first UE may transmit the request to the second UE to periodically transmit the CSI report(s) to the first UE using layer 3 signaling (e.g., PC5-RRC signaling). For example, the first UE may tune a receive beam at a pre-defined set of periodic time periods according to a beamforming alignment with the second UE. In some aspects, the first UE may perform beam-sweeping reception at a set of pre-defined periodic time periods. In some aspects, the first UE may perform the beam-sweeping reception at the set of pre-defined periodic time periods if the beamforming alignment with the second UE fails. In some aspects, the CSI report request transmitted by the first UE may include an indicator (e.g., an index) indicating the configuration for communicating the CSI report in the MAC-CE.

In some aspects, after receiving the CSI report request from the first UE, the second UE may switch to the corresponding receive beam(s) to measure the indicated CSI-RS(s). The second UE may start a timer (e.g., sl-CSI-ReportTimer timer or other suitable timer) after receiving the last CSI-RS indicated by the CSI report request. When the second UE is operating in sidelink mode 1 and while the timer is running, the second UE may send a scheduling request (SR) to a base station to obtain resources to transmit the CSI report in a MAC-CE message to the first UE. When the second UE is operating in sidelink mode 2 and while the timer is running, the second UE may perform a clear channel assessment (CCA) or a listen before talk (LBT) procedure (e.g., a category 3 LBT, category 4 LBT) to obtain resources to transmit the CSI report in a MAC-CE to the first UE. The second UE may transmit the CSI report to the first UE before the timer expires.

In some aspects, the first UE may transmit a transport block (TB) to the second UE. The first UE may transmit the TB via a PSSCH. The first UE may reserve resources for the possible retransmission of the TB. The first UE may transmit the TB, the resource reservation for the CSI-RS(s), and the resource reservation for the retransmission of the TB in the first time period. In some aspects, the resource reservation that reserves the resources for the CSI-RS(s) may also reserve the resources for the potential retransmission of the TB. The first UE may reserve resources for retransmission of the TB in the event that the initial transmission of the TB fails to be properly decoded by the receiving UE. For example, if a negative acknowledgement (NACK) associated with the TB is received by the first UE, the first UE may retransmit the TB to the second UE in the reserved resources. In some aspects, when the TB is properly decoded by the receiving UE, a positive acknowledgement (ACK) may be received by the first UE. In this case, the resources reserved for the retransmission of the TB may be overridden (e.g., re-purposed) for other uses (e.g., transmission of CSI-RS(s)). For example, the first UE may transmit a resource reservation for a CSI-RS that overrides the resource reservation for retransmission of the TB in response to receiving the ACK.

In some aspects, the first UE may transmit the resource reservation and the CSI report request in the first time period. The first UE may transmit the CSI-RS(s) in the second time period while refraining from transmitting a PSSCH in the second time period. In other words, the CSI-RS(s) may be transmitted as standalone CSI-RS(s) in the second time period without the first UE transmitting a PSSCH in the second time period.

In some aspects, the first UE may transmit, to the second UE, an automatic gain control (AGC) symbol before each of the CSI-RS(s). An AGC symbol may be transmitted by the first UE to the second UE to allow the second UE to adjust the strength (e.g., the gain) of a received signal in order to reduce the quantization error of the signal at a receiver of second UE. By transmitting an AGC symbol in a symbol location before (e.g., immediately before) each of the CSI-RS(s), the second UE may adjust a gain setting of its receiver to measure the CSI-RS.

In some aspects, the first UE transmits the resources reservation in one or more sub-slots of the first time period. In some aspects, the first UE transmits the CSI-RS(s) in one or more sub-slots of the second time period. A time period may be partitioned into sub-slots. A sub-slot may include a number of symbols (e.g., contiguous symbols) within the time period. For example, a sub-slot may include 1, 2, 3, 4, 5, or more symbols within the time period. In order to increase the efficient use of resources in a time period, the time period may be partitioned into sub-slots where a subset or all of the sub-slots are used to carry the CSI-RS(s). For example, a time period may include 14 symbols, each sub-slot in the time period may include one symbol for an AGC symbol and one, two or more symbols for the CSI-RS(s).

In some aspects, the resource reservation may indicate periodic resources associated with the CSI-RS(s). The first UE may transmit a resource reservation that includes periodic resources for transmitting the CSI-RS(s). By transmitting a resource reservation that includes periodic resources, the overhead and/or latency associated with transmitting the resource reservation may be reduced compared to transmitting a resource reservation for each of the CSI-RS(s). For example, the resource reservation may include resources reserved for transmitting the CSI-RS(s) in every p-slots and/or in every p sub-slots. The set of resources reserved in every p-slots and/or in every p sub-slots may be used for beam sweeping. For example, the first UE may transmit a CSI-RS for each transmit beam (e.g., each directional antenna) of the first UE and/or for each receive beam (e.g., each directional antenna) of the second UE. In some aspects, the first UE may transmit a codepoint in SCI (e.g., SCI-1, SCI-2) that indicates the period p associated with the periodic resources for transmitting the CSI-RS(s) in every p-slots and/or in every p sub-slots. A codepoint may be a bit or set of bits in the SCI that indicate the period p. In some aspects, the first UE may transmit the codepoint in a traditional (e.g., legacy) position of an SCI-2 carried by a PSSCH. However, the codepoint in a traditional position may be restricted as to the value of p (e.g., the value of p limited to 31 slots). In some aspects, the first UE may transmit the codepoint in a non-traditional position of an SCI-2 or in another information element. The codepoint in the non-traditional position may allow a larger range of values for p (e.g., the value of p may be over 31 slots).

In some aspects, the first UE may transmit the resource reservation in a configured grant (CG) carried by a layer 3 message. In this regard, the first UE may transmit the CG in a radio resource control (RRC) message. The CG may include a resource reservation for periodic transmission of a PSSCH and/or the CSI-RS(s). In some aspects, the first UE may request the CG from a base station (BS). In response, the BS may transmit the CG to the first UE. Within each transmission period of the CG, the first UE may transmit an indicator indicating whether the CSI-RS(s) will be transmitted with the PSSCH. In this regard, the indicator may be transmitted in an SCI (e.g., SCI-1, SCI-2). The second UE may decode the indicator in the SCI to determine whether the first UE will transmit the CSI-RS(s) in the associated transmission period. If the SCI indicates the first UE will transmit the CSI-RS(s) then the second UE may perform measurements on the CSI-RS(s). In some aspects, the SCI may indicate the first UE will not transmit the CSI-RS(s) for that particular transmission period. Instead, the first UE may use the reserved resources indicated by the CG to transmit TB(s) in the PSSCH or to receive TB(s) in the PSSCH. In this way, the first UE may prioritize the reserved resources for transmission of TB(s) over the CSI-RS measurements. In some aspects, the CG may include a resource reservation for periodic transmission of the CSI report(s). The second UE may periodically transmit the CSI reports to the first UE in the reserved resources based on the CSI-RS(s). The second UE may periodically transmit the CSI reports to the first UE in MAC-CE messages. Additionally or alternatively, the second UE may use dynamic channel access to obtain resources to transmit the CSI report(s). For example, the second UE may transmit a resource request to the first UE and/or the BS for resources to transmit the CSI report to the first UE. In response, the first UE and/or the BS may transmit an indicator indicating resource to transmit the CSI report. In some instances, the first UE may transmit an indicator to the second UE indicating whether the second UE should transmit the CSI-report. In this regard, the indicator indicating whether the second UE should transmit the CSI-report may be transmitted in a codepoint in the SCI or via another suitable indicator. In this way, the first UE may receive requested CSI report(s) aperiodically based on the periodic CSI-RS(s).

In some aspects, the first UE may transmit, to a base station (BS), a request for resources reserved for the CSI-RS(s). The first UE may receive an indicator from the BS indicating the resources reserved for the CSI-RS(s) in response to the request. For example, the first UE may operate in sidelink mode 1 in which the UE is in communication with the BS. The first UE may request from the BS resources for the transmission of the CSI-RS(s) from the first UE to the second UE and resources for the transmission of the CSI report from the second UE to the first UE. In this regard, the first UE may request the resources from the BS in a MAC-CE message or a buffer status report (BSR). The resource request may include an indicator indicating the value of k in order to satisfy the beam switching time of the second UE. In response, the BS may transmit an indicator indicating the reserved resources. In this regard, the indicator may be transmitted in a downlink control information message (e.g., DCI-3 message). In some aspects, the indicator may further indicate whether the first UE may override the resources reserved for the retransmission of a TB by resources reserved for the transmission of the CSI-RS(s). In some aspects, the indicator may further indicate whether the reserved resources are periodic resources dedicated for beam sweeping. In some aspects, the indicator may further indicate whether the reserved resources include resources for transmission of an AGC symbol before each CSI-RS.

Figure 10:
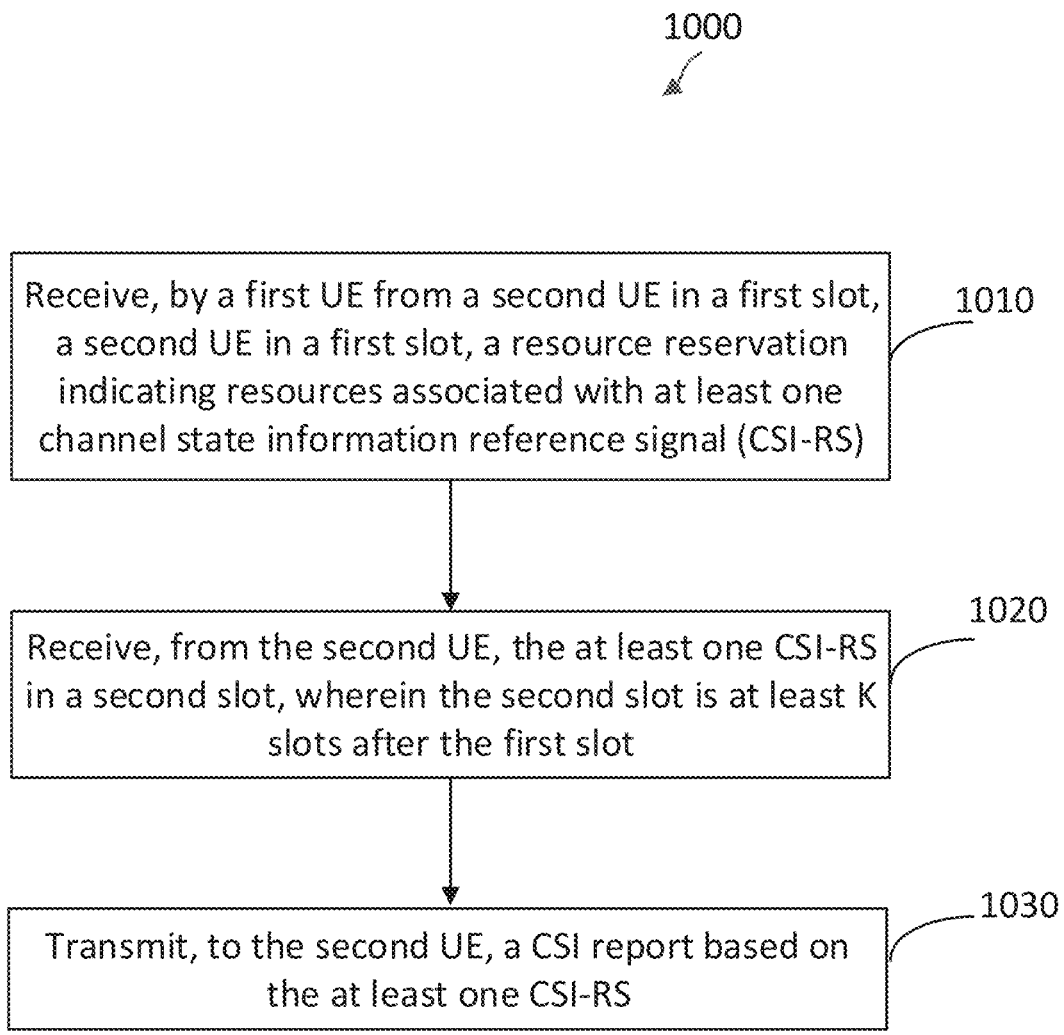
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the UE 115 or UE 700, may utilize one or more components, such as the processor 802, the memory 804, the CSI collection module 808, the transceiver 810, the modem 812, and the one or more antennas 816, to execute aspects of method 1000. The method 1000 may employ similar mechanisms as in the networks 100 and 200 and the aspects and actions described with respect to FIGS. 2-7. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the method 1000 includes a first UE (e.g., the UE 115 or the UE 700) receiving, from a second UE in a first time period, a resource reservation indicating resources associated with at least one channel state information reference signal (CSI-RS). In this regard, the first UE may receive the resource reservation in sidelink control information (SCI) (e.g., SCI-1, SCI-2). The resource reservation may reserve future time and/or frequency resources for the CSI-RS(s). The first UE and the second UE may communicate to each other using sidelink communications in an unlicensed frequency band (e.g., an FR2 band, an FR2x band, a frequency band in the range of about 60 GHz to about 71 GHz, or other unlicensed frequency band). The first UE may receive the CSI-RS(s) from the second UE in order to determine the state of one or more communication channels between the first and second UE. The first UE may perform measurements on the CSI-RS(s) and generate a report that includes channel state information (CSI). As described below, the first UE may transmit the CSI report to the second UE. The second UE may adjust subsequent transmissions based on the CSI report in order to increase the reliability and efficiency of communications with the first UE.

The resource reservation received by the first UE at action 1010 may include time resources including, without limitation, slots, sub-slots, or symbols. The resource reservation may include a number of time periods (e.g., slots, sub-slots, or symbols). Any number of slots, sub-slots, or symbols may be reserved. The number of reserved slots, sub-slots, or symbols may be based on the number of CSI-RSs to be transmitted by the second UE. For example, 1, 2, 3, 4, or any number of CSI-RSs may be transmitted in a time period.

The resource reservation received by the first UE at action 1010 may include frequency resources including, without limitation, a subchannel, a frequency range, or a frequency band. The reserved frequency resources may be the same or different from the frequency resources used by the second UE to transmit the resource reservation. For example, the second UE may transmit a resource reservation in a first frequency range (e.g., a first subchannel) that reserves resources in the first frequency range or in one or more other frequency ranges (e.g., a second subchannel, a third sub-channel, etc.).

At action 1020, the method 1000 includes the first UE (e.g., the UE 115 or the UE 700) receiving, from the second UE, the CSI-RS(s) in a second time period. The second time period may be different than the first time period. In some instances, the second time period may be at least k time periods after the first time period. In this regard, the resource reservation at 1010 may reserve time resources (e.g., slot, sub-slots, symbols) in a second time period at least k time periods or more after the first time period for second UE to transmit the CSI-RS(s). The value of k may be based on a beam switching time associated with a beam (e.g., a transmit beam, a receive beam) of the first UE. The beam may be a beamformed signal that focuses signal energy in a specific beam direction towards an intended transmitter or receiver. A beamformed signal may allow multiple transmitters to transmit at the same time in different spatial directions without interfering with each other and/or with minimal interference. The specific beam direction for the beam switching time may be based on a configuration of an antenna of the UE. In this regard, the antenna may switch between the different beam directions. A beam switching time may be the time required for the UE to switch the beam direction of the antenna from a first beam direction to a second beam direction. Each of the CSI-RS(s) may be associated with a particular beam direction with one or more of the CSI-RS(s) having a different beam direction than another of the CSI-RS(s). Accordingly, the first UE may need to switch beam directions before receiving the CSI-RS(s).

The beam switching time associated with a beam of the first UE may be based on the processing capabilities of the first UE. For example, the first UE may have latencies associated with code execution and/or memory access that affect the beam switching time. The first UE may also have latencies associated with radio frequency components of the first UE's transceiver and/or antenna that contribute to the beam switching time. In some aspects, the beam switching time may be based on a subcarrier spacing (SCS) associated with a physical sidelink control channel (PSCCH). The second UE may transmit a communication to the first UE via the PSCCH. In this regard, the SCS of the PSCCH may be 15 kHz, 30 kHz, 60 kHz, 120 kHz, 240 kHz, 480 kHz, or 960 kHz, or other suitable spacing. When communicating in a higher frequency band (e.g., FR2, FR2x, 60 GHz), a higher SCS (e.g., 480 kHz, 960 kHz, or other spacing) may improve robustness of the OFDM waveform against frequency impairments caused by Doppler effects, carrier frequency offsets, and/or hardware phase noise. However, the higher SCS may also increase the beam switching time. In order to compensate for increased beam switching time, the value of k (e.g., the number of time periods between the transmission of the resource reservation for the CSI-RS(s) by the second UE and the transmission of the CSI-RS(s) by the second UE) may be based on the SCS of the PSCCH communication.

In some aspects, the second UE may transmit a request for a CSI report (e.g., a CSI report trigger) to the first UE. The second UE may transmit the CSI report request aperiodically or periodically. In some instances, the second UE may transmit the CSI report request in the same time period that the second UE transmits the resource reservation for the CSI-RS(s). In this regard, the second UE may transmit the request for the CSI report in sidelink control information (SCI) (e.g., SCI-1, SCI-2). The first UE may respond to the CSI report request by performing CSI measurements in the reserved resources for the CSI-RS(s) and transmitting the CSI report to the second UE. The second UE may use the information in the CSI report to modify communication parameters (e.g., modulation, code rate, beam forming, frequency band, etc.) of future communications between the first UE and the second UE. The CSI report may include information related to the channel conditions between the first and second UEs for each of the beams (e.g., 1, 2, 4, 8, 16, or more beams). For example, the CSI report may include, for each beam, a channel quality indicator (CQI), a reference signal received power (RSRP), a reference signal received quality (RSRQ), a signal to interference and noise ratio (SINR), and/or a rank indicator (RI).

In some aspects, the second UE may transmit a request for a plurality of CSI reports. In response to the request, the first UE may transmit the plurality of CSI reports based on the CSI-RS(s). The second UE may transmit a single request (e.g., a CSI report trigger) for a plurality of CSI reports. The CSI report request may include a request for channel measurement and interference measurement (e.g., simultaneous channel measurement and interference measurement) based on the reserved resources (e.g., periodic reserved resources) for the CSI-RS(s). The request for the plurality of CSI reports may be configured in a layer 3 message (e.g., a PC5-RRC message). For example, the layer 3 message may be a CSI-AperiodicTriggerStateList message or other suitable message. In some aspects, the second UE may transmit the CSI report trigger to the first UE to request the CSI report(s). For example, the second UE may transmit an indicator (e.g., an index) in the SCI to request the CSI report(s) from the first UE.

At action 1030, the method 1000 includes the first UE (e.g., the UE 115 or the UE 700) transmitting, to the second UE, the CSI report based on the CSI-RS(s) transmitted by the second UE to the first UE. In this regard, the second UE may receive the CSI report in a medium access control (MAC) control element (CE). The MAC-CE may be received by the second UE from the first UE via a physical sidelink shared channel (PSSCH). After transmitting the CSI-RS(s), the second UE may start a timer (e.g., sl-LatencyBound-CSI-Report timer or other suitable timer). The second UE may stay in receive mode for at least the time span defined by the timer to receive the CSI report. The first UE may perform the CSI measurements on the received CSI-RS(s), generate the CSI report, and transmit the CSI report to the second UE within the time span defined by the timer. In some aspects, the second UE may transmit a request to the first UE to periodically transmit the CSI report(s) to the second UE. In this regard, the second UE may transmit the request to the first UE to periodically transmit the CSI report(s) to the second UE using layer 3 signaling (e.g., PC5-RRC signaling). For example, the second UE may tune a receive beam at a pre-defined set of periodic time periods according to a beamforming alignment with the first UE. In some aspects, the second UE may perform beam-sweeping reception at a set of pre-defined periodic time periods. In some aspects, the second UE may perform the beam-sweeping reception at the set of pre-defined periodic time periods if the beamforming alignment with the first UE fails. In some aspects, the CSI report request transmitted by the second UE may include an indicator (e.g., an index) indicating the configuration for communicating the CSI report in the MAC-CE.

In some aspects, after receiving the CSI report request from the second UE, the first UE may switch to the corresponding receive beam(s) to measure the indicated CSI-RS(s). The first UE may start a timer (e.g., sl-CSI-ReportTimer timer or other suitable timer) after receiving the last CSI-RS indicated by the CSI report request. When the first UE is operating in sidelink mode 1 and while the timer is running, the first UE may send a scheduling request (SR) to a base station to obtain resources to transmit the CSI report in a MAC-CE message to the second UE. When the first UE is operating in sidelink mode 2 and while the timer is running, the first UE may perform a clear channel assessment (CCA) or a listen before talk (LBT) procedure (e.g., a category 3 LBT, category 4 LBT) to obtain resources to transmit the CSI report in a MAC-CE to the second UE. The first UE may transmit the CSI report to the second UE before the timer expires.

In some aspects, the second UE may transmit a transport block (TB) to the first UE. The second UE may transmit the TB via a PSSCH. The second UE may reserve resources for the possible retransmission of the TB. The second UE may transmit the TB, the resource reservation for the CSI-RS(s), and the resource reservation for the retransmission of the TB in the first time period. In some aspects, the resource reservation that reserves the resources for the CSI-RS(s) may also reserve the resources for the potential retransmission of the TB. The second UE may reserve resources for retransmission of the TB in the event that the initial transmission of the TB fails to be properly decoded by the first UE. For example, if a negative acknowledgement (NACK) associated with the TB is received by the second UE, the second UE may retransmit the TB to the first UE in the reserved resources. In some aspects, when the TB is properly decoded by the first UE, a positive acknowledgement (ACK) may be received by the second UE. In this case, the resources reserved for the retransmission of the TB may be overridden (e.g., re-purposed) for other uses (e.g., transmission of CSI-RS(s)). For example, the second UE may transmit a resource reservation for a CSI-RS that overrides the resource reservation for retransmission of the TB in response to receiving the ACK.

In some aspects, the second UE may transmit the resource reservation and the CSI report request in the first time period. The second UE may transmit the CSI-RS(s) in the second time period while refraining from transmitting a PSSCH in the second time period. In other words, the CSI-RS(s) may be transmitted as standalone CSI-RS(s) in the second time period without the second UE transmitting a PSSCH in the second time period.

In some aspects, the second UE may transmit, to the first UE, an automatic gain control (AGC) symbol before each of the CSI-RS(s). An AGC symbol may be transmitted by the second UE to the first UE to allow the first UE to adjust the strength (e.g., the gain) of a received signal in order to reduce the quantization error of the signal at a receiver of first UE. By transmitting an AGC symbol in a symbol location before (e.g., immediately before) each of the CSI-RS(s), the first UE may adjust a gain setting of its receiver to measure the CSI-RS.

In some aspects, the second UE transmits the resources reservation in one or more sub-slots of the first time period. In some aspects, the second UE transmits the CSI-RS(s) in one or more sub-slots of the second time period. A time period may be partitioned into sub-slots. A sub-slot may include a number of symbols (e.g., contiguous symbols) within the time period. For example, a sub-slot may include 1, 2, 3, 4, 5, or more symbols within the time period. In order to increase the efficient use of resources in a time period, the time period may be partitioned into sub-slots where a subset or all of the sub-slots are used to carry the CSI-RS(s). For example, a time period may include 14 symbols, each sub-slot in the time period may include one symbol for an AGC symbol and one, two or more symbols for the CSI-RS(s).

In some aspects, the resource reservation may indicate periodic resources associated with the CSI-RS(s). The second UE may transmit a resource reservation that includes periodic resources for transmitting the CSI-RS(s). By transmitting a resource reservation that includes periodic resources, the overhead and/or latency associated with transmitting the resource reservation may be reduced compared to transmitting a resource reservation for each of the CSI-RS(s). For example, the resource reservation may include resources reserved for transmitting the CSI-RS(s) in every p-slots and/or in every p sub-slots. The set of resources reserved in every p-slots and/or in every p sub-slots may be used for beam sweeping. For example, the second UE may transmit a CSI-RS for each transmit beam (e.g., each directional antenna) of the second UE and/or for each receive beam (e.g., each directional antenna) of the first UE. In some aspects, the second UE may transmit a codepoint in SCI (e.g., SCI-1, SCI-2) that indicates the period p associated with the periodic resources for transmitting the CSI-RS(s) in every p-slots and/or in every p sub-slots. A codepoint may be a bit or set of bits in the SCI that indicate the period p. In some aspects, the second UE may transmit the codepoint in a traditional (e.g., legacy) position of an SCI-2 carried by a PSSCH. However, the codepoint in a traditional position may be restricted as to the value of p (e.g., the value of p limited to 31 slots). In some aspects, the second UE may transmit the codepoint in a non-traditional position of an SCI-2 or in another information element. The codepoint in the non-traditional position may allow a larger range of values for p (e.g., the value of p may be over 31 slots).

In some aspects, the second UE may transmit the resource reservation in a configured grant (CG) carried by a layer 3 message. In this regard, the second UE may transmit the CG in a radio resource control (RRC) message. The CG may include a resource reservation for periodic transmission of a PSSCH and/or the CSI-RS(s). In some aspects, the second UE may request the CG from a base station (BS). In response, the BS may transmit the CG to the second UE. Within each transmission period of the CG, the second UE may transmit an indicator indicating whether the CSI-RS(s) will be transmitted with the PSSCH. In this regard, the indicator may be transmitted in an SCI (e.g., SCI-1, SCI-2). The first UE may decode the indicator in the SCI to determine whether the second UE will transmit the CSI-RS(s) in the associated transmission period. If the SCI indicates the second UE will transmit the CSI-RS(s) then the first UE may perform measurements on the CSI-RS(s). In some aspects, the SCI may indicate the second UE will not transmit the CSI-RS(s) for that particular transmission period. Instead, the second UE may use the reserved resources indicated by the CG to transmit TB(s) in the PSSCH or to receive TB(s) in the PSSCH. In this way, the second UE may prioritize the reserved resources for transmission of TB(s) over the CSI-RS measurements. In some aspects, the CG may include a resource reservation for periodic transmission of the CSI report(s). The first UE may periodically transmit the CSI reports to the second UE in the reserved resources based on the CSI-RS(s). The first UE may periodically transmit the CSI reports to the second UE in MAC-CE messages. Additionally or alternatively, the first UE may use dynamic channel access to obtain resources to transmit the CSI report(s). For example, the first UE may transmit a resource request to the second UE and/or the BS for resources to transmit the CSI report to the second UE. In response, the second UE and/or the BS may transmit an indicator indicating resource to transmit the CSI report. In some instances, the second UE may transmit an indicator to the first UE indicating whether the first UE should transmit the CSI-report. In this regard, the indicator indicating whether the first UE should transmit the CSI-report may be transmitted in a codepoint in the SCI or via another suitable indicator. In this way, the second UE may receive requested CSI report(s) aperiodically based on the periodic CSI-RS(s).

In some aspects, the second UE may transmit, to a base station (BS), a request for resources reserved for the CSI-RS(s). The second UE may receive an indicator from the BS indicating the resources reserved for the CSI-RS(s) in response to the request. For example, the second UE may operate in sidelink mode 1 in which the second UE is in communication with the BS. The second UE may request from the BS resources for the transmission of the CSI-RS(s) from the second UE to the first UE and resources for the transmission of the CSI report from the first UE to the second UE. In this regard, the second UE may request the resources from the BS in a MAC-CE message or a buffer status report (BSR). The resource request may include an indicator indicating the value of k in order to satisfy the beam switching time of the first UE. In response, the BS may transmit an indicator indicating the reserved resources. In this regard, the indicator may be transmitted in a downlink control information message (e.g., DCI-3 message). In some aspects, the indicator may further indicate whether the second UE may override the resources reserved for the retransmission of a TB by resources reserved for the transmission of the CSI-RS(s). In some aspects, the indicator may further indicate whether the reserved resources are periodic resources dedicated for beam sweeping. In some aspects, the indicator may further indicate whether the reserved resources include resources for transmission of an AGC symbol before each CSI-RS.

By way of non-limiting examples, the following aspects are included in the present disclosure.

Aspect 1 includes a method of wireless communication performed by a first user equipment (UE), the method comprising transmitting, to a second UE in a first time period, a resource reservation indicating resources associated with at least one channel state information reference signal (CSI-RS); transmitting, to the second UE, the at least one CSI-RS in a second time period, wherein the second time period is at least K time periods after the first time period; and receiving, from the second UE, a CSI report based on the at least one CSI-RS.

Aspect 2 includes the method of aspect 1, further comprising transmitting, to the second UE, a request for the CSI report in the first time period.

Aspect 3 includes the method of any of aspects 1-2, wherein the transmitting the request for the CSI report comprises transmitting the request in sidelink control information (SCI); and the transmitting the resource reservation indicating resources associated with the at least one CSI-RS comprises transmitting the resource reservation in the SCI.

Aspect 4 includes the method of any of aspects 1-3, wherein a value of K is based on a beam switching time associated with the second UE.

Aspect 5 includes the method of any of aspects 1-4, wherein the beam switching time is based on radio frequency processing capabilities associated with the second UE.

Aspect 6 includes the method of any of aspects 1-5, further comprising transmitting, to the second UE, a communication via a physical sidelink control channel (PSCCH), wherein the beam switching time is based on a subcarrier spacing associated with the PSCCH.

Aspect 7 includes the method of any of aspects 1-6, further comprising transmitting, to the second UE, a plurality of CSI-RS s in a plurality of time periods; and wherein each of the plurality of CSI-RSs corresponds to a respective beam; the plurality of CSI-RSs includes the at least one CSI-RS; and the plurality of time periods includes the second time period.

Aspect 8 includes the method of any of aspects 1-7, wherein the receiving the CSI report comprises receiving the CSI report in a medium access control (MAC) control element.

Aspect 9 includes the method of any of aspects 1-8, further comprising transmitting, to the second UE, a transport block (TB), wherein the resource reservation further indicates resources reserved for a retransmission of the TB.

Aspect 10 includes the method of any of aspects 1-9, further comprising refraining from transmitting a physical sidelink shared channel in the second time period.

Aspect 11 includes the method of any of aspects 1-10, further comprising transmitting, to the second UE, a retransmission resource reservation indicating resources associated with a retransmission of a transport block (TB); transmitting, to the second UE, the TB; receiving, from the second UE, an acknowledgement indicating successful decoding of the TB; and transmitting, to the second UE, a resource reservation for at least one other CSI-RS overriding the retransmission resource reservation.

Aspect 12 includes the method of any of aspects 1-11, wherein the transmitting the at least one CSI-RS comprises transmitting, to the second UE, a plurality of CSI-RSs, the plurality of CSI-RSs including the at least one CSI-RS and further comprising transmitting, to the second UE, an automatic gain control symbol before each of the plurality of CSI-RSs.

Aspect 13 includes the method of any of aspects 1-12, wherein the first time period is at least one of a first slot or a first sub-slot; and the second time period is at least one of a second slot or a second sub-slot.

Aspect 14 includes the method of any of aspects 1-13, wherein the transmitting the resource reservation comprises transmitting the resource reservation indicating periodic resources associated with the at least one CSI-RS.

Aspect 15 includes the method of any of aspects 1-14, wherein the transmitting the resource reservation indicating the periodic resources associated with the at least one CSI-RS comprises transmitting a codepoint in sidelink control information (SCI) that indicates a period associated with the periodic resources.

Aspect 16 includes the method of any of aspects 1-15, further comprising transmitting, to the second UE, sidelink control information (SCI) indicating a request for a plurality of CSI reports, wherein the plurality of CSI reports includes the CSI report; and receiving, from the second UE, the plurality of CSI reports based on the at least one CSI-RS.

Aspect 17 includes the method of any of aspects 1-16, wherein the transmitting the resource reservation comprises transmitting the resource reservation in a configured grant (CG) carried by a radio resource control (RRC) signal.

Aspect 18 includes the method of any of aspects 1-17, wherein the CG comprises a CSI resource reservation indicating resources associated with the CSI report; and the receiving the CSI report comprises receiving the CSI report periodically based on the CSI resource reservation.

Aspect 19 includes the method of any of aspects 1-18, further comprising transmitting, to a base station (BS), a request for the resource reservation; and
receiving, from the BS, an indicator indicating the resources associated with the at least one CSI-RS.

Aspect 20 includes a method of wireless communication performed by a first user equipment (UE), the method comprising receiving, from a second UE in a first time period, a resource reservation indicating resources associated with at least one channel state information reference signal (CSI-RS); receiving, from the second UE, the at least one CSI-RS in a second time period, wherein the second time period is at least K time periods after the first time period; and transmitting, to the second UE, a CSI report based on the at least one CSI-RS.

Aspect 21 includes the method of aspect 20, first user equipment (UE), the method comprising receiving, from a second UE in a first time period, a resource reservation indicating resources associated with at least one channel state information reference signal (CSI-RS); receiving, from the second UE, the at least one CSI-RS in a second time period, wherein the second time period is at least K time periods after the first time period; and transmitting, to the second UE, a CSI report based on the at least one CSI-RS.

Aspect 22 includes the method of any of aspects 20-21, wherein a value of K is based on a beam switching time associated with the first UE; the beam switching time is based on radio frequency processing capabilities associated with the first UE; and further comprising receiving, from the second UE, a communication via a physical sidelink control channel (PSCCH), wherein the beam switching time is further based on a subcarrier spacing associated with the PSCCH.

Aspect 23 includes the method of any of aspects 20-22, further comprising receiving, from the second UE, a plurality of CSI-RSs in a plurality of time periods; and wherein each of the plurality of CSI-RSs corresponds to a beam; and the plurality of CSI-RSs includes the at least one CSI-RS.

Aspect 24 includes the method of any of aspects 20-23, further comprising receiving, from the second UE, a retransmission resource reservation indicating resources associated with a retransmission of a transport block (TB); receiving, from the second UE, the TB; transmitting, to the second UE, an acknowledgement indicating successful decoding of the TB; and receiving, from the second UE, a resource reservation for at least one other CSI-RS overriding the retransmission resource reservation.

Aspect 25 includes the method of any of aspects 20-24, wherein the receiving the resource reservation comprises at least one of receiving the resource reservation indicating periodic resources associated with the at least one CSI-RS; or receiving the resource reservation in a configured grant (CG) carried by a radio resource control (RRC) signal.

Aspect 26 includes a first user equipment (UE) comprising a transceiver, a memory, and a processor coupled to the transceiver and the memory, the first UE configured to perform any one of aspects 1-19.

Aspect 27 includes a first user equipment (UE) comprising a transceiver, a memory, and a processor coupled to the transceiver and the memory, the first UE configured to perform any one of aspects 20-25.

Aspect 28 includes a non-transitory computer-readable medium storing one or more instructions for wireless communication, the one or more instructions comprising one or more instructions that, when executed by one or more processors of a first user equipment, cause the one or more processors to perform any one of aspects 1-19.

Aspect 29 includes a non-transitory computer-readable medium storing one or more instructions for wireless communication, the one or more instructions comprising one or more instructions that, when executed by one or more processors of a first user equipment, cause the one or more processors to perform any one of aspects 20-25.

Aspect 30 includes a first user equipment (UE) comprising one or more means to perform any one or more of aspects 1-19.

Aspect 31 includes a first user equipment (UE) comprising one or more means to perform any one or more of aspects 20-25.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
   transmitting, to a second UE in a first time period, a resource reservation indicating resources associated with at least one channel state information reference signal (CSI-RS);
   transmitting, to the second UE, the at least one CSI-RS in a second time period, wherein the second time period is at least K time periods after the first time period, wherein K is a positive integer, and wherein the time periods comprise at least one of slots or sub-slots;
   receiving, from the second UE, a CSI report based on the at least one CSI-RS;
   transmitting, to the second UE, a retransmission resource reservation indicating resources associated with a retransmission of a transport block (TB); and
   transmitting, to the second UE, a resource reservation for at least one other CSI-RS overriding the retransmission resource reservation.

2. The method of claim 1, wherein:
   a value of K is based on a beam switching time associated with the second UE;
   the beam switching time is based on radio frequency processing capabilities associated with the second UE; and
   the method further comprises:
      transmitting, to the second UE, a communication via a physical sidelink control channel (PSCCH), wherein the beam switching time is based on a subcarrier spacing associated with the PSCCH.

3. The method of claim 1, further comprising:
   transmitting, to the second UE, a plurality of CSI-RSs in a plurality of time periods; and
   wherein:
      each of the plurality of CSI-RSs corresponds to a respective beam;
      the plurality of CSI-RSs includes the at least one CSI-RS; and
      the plurality of time periods includes the second time period.

4. A method of wireless communication performed by a first user equipment (UE), the method comprising:
   receiving, from a second UE in a first time period, a resource reservation indicating resources associated with at least one channel state information reference signal (CSI-RS);
   receiving, from the second UE, the at least one CSI-RS in a second time period, wherein the second time period is at least K time periods after the first time period, wherein K is a positive integer, and wherein the time periods comprise at least one of slots or sub-slots;
   transmitting, to the second UE, a CSI report based on the at least one CSI-RS;
   receiving, from the second UE, a retransmission resource reservation indicating resources associated with a retransmission of a transport block (TB); and
   receiving, from the second UE, a resource reservation for at least one other CSI-RS overriding the retransmission resource reservation.

5. The method of claim 4, wherein:
   a value of K is based on a beam switching time associated with the first UE;
   the beam switching time is based on radio frequency processing capabilities associated with the first UE; and
   further comprising:
      receiving, from the second UE, a communication via a physical sidelink control channel (PSCCH), wherein the beam switching time is further based on a subcarrier spacing associated with the PSCCH.

6. A first user equipment (UE) comprising:
   a memory;
   a transceiver; and
   at least one processor coupled to the memory and the transceiver, wherein the first UE is configured to:
      transmit, to a second UE in a first time period, a resource reservation indicating resources associated with at least one channel state information reference signal (CSI-RS);
      transmit, to the second UE, the at least one CSI-RS in a second time period, wherein the second time period is at least K time periods after the first time period, wherein K is a positive integer, and wherein the time periods comprise at least one of slots or sub-slots;
      receive, from the second UE, a CSI report based on the at least one CSI-RS;
      transmit, to the second UE, a retransmission resource reservation indicating resources associated with a retransmission of a transport block (TB); and
      transmit, to the second UE, a resource reservation for at least one other CSI-RS overriding the retransmission resource reservation.

7. The first UE of claim 6, wherein the first UE is further configured to:
   transmit, to the second UE, a request for the CSI report in the first time period.

8. The first UE of claim 7, wherein the first UE is further configured to:
   transmit the request in sidelink control information (SCI); and
   transmit the resource reservation in the SCI.

9. The first UE of claim 6, wherein a value of K is based on a beam switching time associated with the second UE.

10. The first UE of claim 9, wherein the beam switching time is based on radio frequency processing capabilities associated with the second UE.

11. The first UE of claim 9, wherein the first UE is further configured to:
    transmit, to the second UE, a communication via a physical sidelink control channel (PSCCH), wherein the beam switching time is based on a subcarrier spacing associated with the PSCCH.

12. The first UE of claim 6, wherein the first UE is further configured to:
    transmit, to the second UE, a plurality of CSI-RSs in a plurality of time periods, wherein:

each of the plurality of CSI-RSs corresponds to a respective beam;
the plurality of CSI-RSs includes the at least one CSI-RS; and
the plurality of time periods includes the second time period.

13. The first UE of claim 6, wherein the first UE is further configured to:
receive the CSI report in a medium access control (MAC) control element.

14. The first UE of claim 6, wherein the first UE is further configured to:
transmit, to the second UE, a transport block (TB), wherein the resource reservation further indicates resources reserved for a retransmission of the TB.

15. The first UE of claim 6, wherein the first UE is further configured to:
refrain from transmitting a physical sidelink shared channel in the second time period.

16. The first UE of claim 6, wherein the first UE is further configured to:
transmit, to the second UE, the TB; and
receive, from the second UE, an acknowledgement indicating successful decoding of the TB.

17. The first UE of claim 6, wherein the first UE is further configured to:
transmit, to the second UE, a plurality of CSI-RSs, the plurality of CSI-RSs including the at least one CSI-RS; and
transmit, to the second UE, an automatic gain control symbol before each of the plurality of CSI-RSs.

18. The first UE of claim 6, wherein:
the first time period is at least one of a first slot or a first sub-slot; and
the second time period is at least one of a second slot or a second sub-slot.

19. The first UE of claim 6, wherein the first UE is further configured to:
transmit the resource reservation indicating periodic resources associated with the at least one CSI-RS.

20. The first UE of claim 19, wherein the first UE is further configured to:
transmit a codepoint in sidelink control information (SCI) that indicates a period associated with the periodic resources.

21. The first UE of claim 6, wherein the first UE is further configured to:
transmit, to the second UE, sidelink control information (SCI) indicating a request for a plurality of CSI reports, wherein the plurality of CSI reports includes the CSI report; and
receive, from the second UE, the plurality of CSI reports based on the at least one CSI-RS.

22. The first UE of claim 6, wherein the first UE is further configured to:
transmit the resource reservation in a configured grant (CG) carried by a radio resource control (RRC) signal.

23. The first UE of claim 22, wherein:
the CG comprises a CSI resource reservation indicating resources associated with the CSI report; and
the first UE is further configured to:
receive the CSI report periodically based on the CSI resource reservation.

24. The first UE of claim 6, wherein the first UE is further configured to:
transmit, to a base station (BS), a request for the resource reservation; and
receive, from the BS, an indicator indicating the resources associated with the at least one CSI-RS.

25. A first user equipment (UE) comprising:
a memory;
a transceiver; and
at least one processor coupled to the memory and the transceiver, wherein the first UE is configured to:
receive, from a second UE in a first time period, a resource reservation indicating resources associated with at least one channel state information reference signal (CSI-RS);
receive, from the second UE, the at least one CSI-RS in a second time period, wherein the second time period is at least K time periods after the first time period, wherein K is a positive integer, and wherein the time periods comprise at least one of slots or sub-slots;
transmit, to the second UE, a CSI report based on the at least one CSI-RS;
receive, from the second UE, a retransmission resource reservation indicating resources associated with a retransmission of a transport block (TB); and
receive, from the second UE, a resource reservation for at least one other CSI-RS overriding the retransmission resource reservation.

26. The first UE of claim 25, wherein the first UE is further configured to:
receive, from the second UE, a request for the CSI report in the first time period in sidelink control information (SCI); and
receive the resource reservation in the SCI.

27. The first UE of claim 25, wherein
a value of K is based on a beam switching time associated with the first UE;
the beam switching time is based on radio frequency processing capabilities associated with the first UE; and
the first UE is further configured to:
receive, from the second UE, a communication via a physical sidelink control channel (PSCCH), wherein the beam switching time is further based on a subcarrier spacing associated with the PSCCH.

28. The first UE of claim 25, wherein the first UE is further configured to:
receive, from the second UE, a plurality of CSI-RSs in a plurality of time periods, wherein:
each of the plurality of CSI-RSs corresponds to a beam; and
the plurality of CSI-RSs includes the at least one CSI-RS.

29. The first UE of claim 25, wherein the first UE is further configured to:
receive, from the second UE, the TB; and
transmit, to the second UE, an acknowledgement indicating successful decoding of the TB.

30. The first UE of claim 25, wherein the first UE is further configured to:
receive the resource reservation indicating periodic resources associated with the at least one CSI-RS; and
receive the resource reservation in a configured grant (CG) carried by a radio resource control (RRC) signal.

* * * * *